United States Patent
Longacre, Jr.

(10) Patent No.: US 9,195,907 B1
(45) Date of Patent: *Nov. 24, 2015

(54) METHOD FOR OMNIDIRECTIONAL PROCESSING OF 2D IMAGES INCLUDING RECOGNIZABLE CHARACTERS

(71) Applicant: Hand Held Products, Inc., Fort Mill, SC (US)

(72) Inventor: Andrew Longacre, Jr., Skaneateles, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/041,708

(22) Filed: Sep. 30, 2013

Related U.S. Application Data

(63) Continuation of application No. 12/814,019, filed on Jun. 11, 2010, now Pat. No. 8,682,077, which is a continuation of application No. 12/315,858, filed on Dec. 5, 2008, now abandoned, which is a continuation of application No. 12/069,438, filed on Feb. 7, 2008, now abandoned, which is a continuation of application No. 10/774,218, filed on Feb. 6, 2004, now abandoned, which is a continuation of application No. 09/724,367, filed on Nov. 28, 2000, now abandoned.

(51) Int. Cl.
G06K 9/00 (2006.01)
G06K 9/34 (2006.01)
G06K 9/62 (2006.01)
G06T 7/00 (2006.01)

(52) U.S. Cl.
CPC ........... G06K 9/6201 (2013.01); G06T 7/0081 (2013.01); G06T 2207/20148 (2013.01)

(58) Field of Classification Search
USPC .......................................... 382/181, 176, 177
See application file for complete search history.

(56) References Cited

U.S. PATENT DOCUMENTS

| 4,088,981 | A | * | 5/1978 | Gott ............................. 382/313 |
| 5,999,647 | A | * | 12/1999 | Nakao et al. ................. 382/187 |
| 8,682,077 | B1 | * | 3/2014 | Longacre, Jr. ............... 382/181 |

* cited by examiner

*Primary Examiner* — John Strege
(74) *Attorney, Agent, or Firm* — Additon, Higgins & Pendleton, P.A.

(57) ABSTRACT

The invention is a method for omnidirectional recognition of recognizable characters in a captured two-dimensional image. An optical reader configured in accordance with the invention searches for pixel groupings in a starburst pattern, and subjects located pixel groupings to a preliminary edge crawling process which records the pixel position of the grouping's edge and records the count of edge pixels. If two similar-sized pixel groupings are located that are of sizes sufficient to potentially represent recognizable characters, then the reader launches "alignment rails" at pixel positions substantially parallel to a centerline connecting the center points of the two similarly sized groupings. A reader according to the invention searches for additional recognizable characters within the rail area, and subjects each located pixel grouping within the rail area to a shape-characterizing edge crawling process for developing data that characterizes the shape of a pixel grouping's edge. After adjusting the orientation representation of the shape-characterizing data the reader compares the developed shape-characterizing data to previously stored shape-characterizing data to determine the character represented by the grouping on the basis of the best fit data.

7 Claims, 16 Drawing Sheets

| 100 P1 | 110 P2 | 115 P3 | 125 P4 |
|---|---|---|---|
| 105 P5 | 120 P6 | 125 P7 | 135 P8 |
| 115 P9 | 120 P10 | 130 P11 | 135 P12 |
| 125 P13 | 125 P14 | 130 P15 | 135 P16 |

| 100 P1 | 105 P1-2 | 110 P2 | 112.5 P2-3 | 115 P3 | 120 P3-4 | 125 P4 |
|---|---|---|---|---|---|---|
| 102.5 P1-5 | 108.8 P1-2-5-6 | 115 P2-6 | 117.5 P2-3-6-7 | 120 P3-7 | 125 | 130 P4-8 |
| 105 P5 | 112.5 P5-6 | 120 P6 | 122.5 P6-7 | 125 P7 | 130 P7-8 | 135 P8 |
| 110 P5-9 | 115 P5-6-9-10 | 120 P6-10 | 123.8 P6-7-10-11 | 127.5 P7-11 | 131.3 P7-8-11-12 | 135 P8-12 |
| 115 P9 | 117.5 P9-10 | 120 P10 | 125 P10-11 | 130 P11 | 132.5 P11-12 | 135 P12 |
| 120 P9-13 | 121.3 P9-10-13-14 | 122.5 P10-14 | 126.3 P10-11-14-15 | 130 P11-13 | 132.5 P11-12-15-16 | 135 P12-16 |
| 125 P13 | 125 P13-14 | 125 P14 | 127.5 P14-15 | 130 P15 | 132.5 P15-16 | 135 P16 |

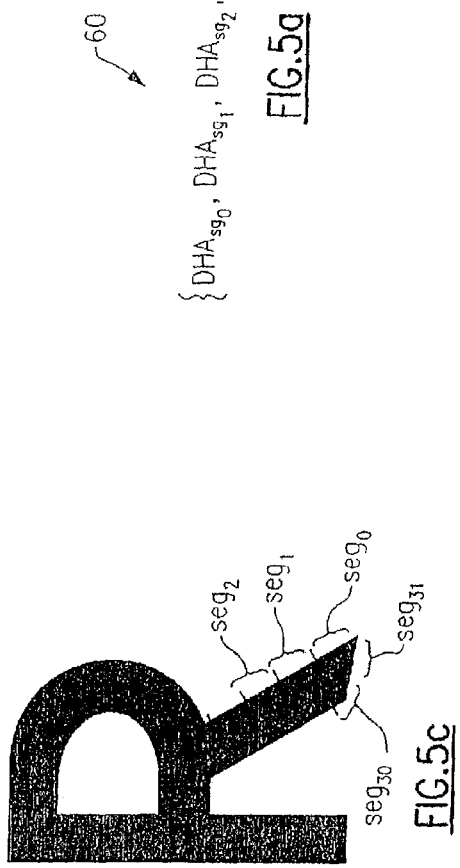
FIG.5c
$\{DHA_{sg_0}, DHA_{sg_1}, DHA_{sg_2}, \ldots DHA_{sgm-1}\}$
FIG.5a
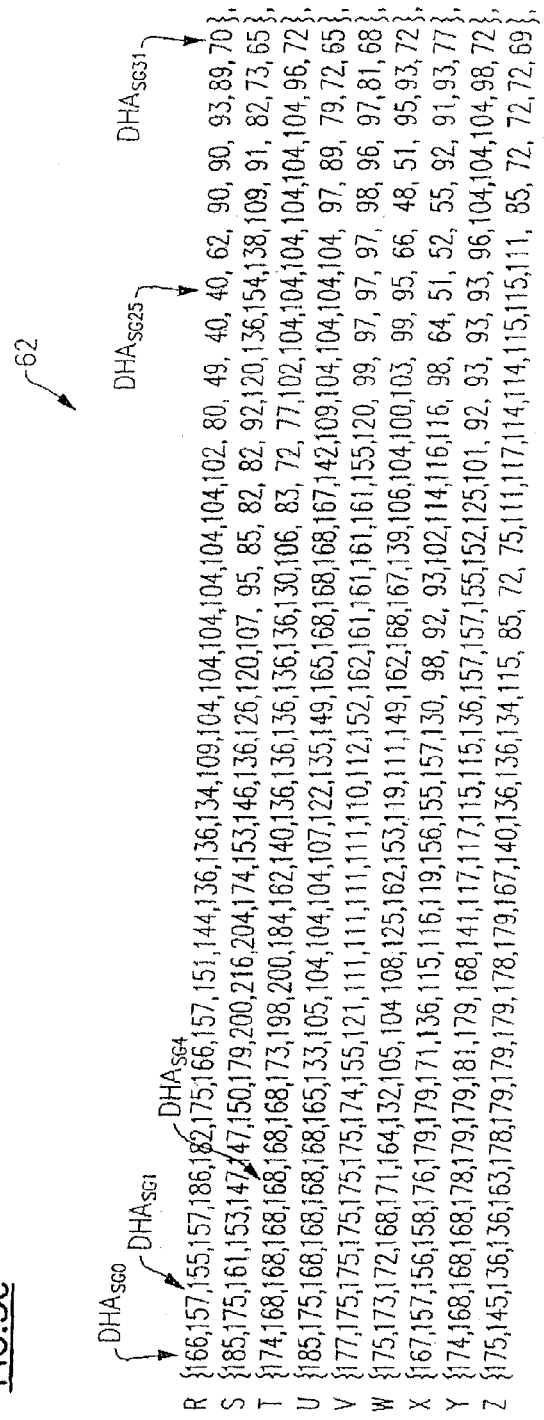
FIG.5b

METHOD FOR OMNIDIRECTIONAL PROCESSING OF 2D IMAGES INCLUDING RECOGNIZABLE CHARACTERS

CROSS REFERENCE TO RELATED APPLICATIONS

The present application is a continuation of U.S. patent application Ser. No. 12/814,019 filed Jun. 11, 2010 entitled "Method For Omnidirectional Processing of 2D Images Including Recognizable Characters" which is a continuation of U.S. patent application Ser. No. 12/315,858 filed Dec. 5, 2008 entitled "Method For Omnidirectional Processing of 2D Images Including Recognizable Characters" which is a continuation of U.S. patent application Ser. No. 12/069,438 filed Feb. 7, 2008 entitled "Method For Omnidirectional Processing Of 2D Images Including Recognizable Characters" which is a continuation of U.S. patent application Ser. No. 10/774,218 filed Feb. 6, 2004 entitled "Method For Omnidirectional Processing Of 2D Images Including Recognizable Characters" which is a continuation of U.S. patent application Ser. No. 09/724,367 filed Nov. 28, 2000 entitled "Method For Omnidirectional Processing Of 2D Images Including Recognizable Characters." Priority of each of the above applications is claimed and each of the above applications is incorporated herein by reference in its entirety.

FIELD OF THE INVENTION

The invention relates to optical readers in general and specifically to a method for processing images including recognizable characters.

BACKGROUND OF THE PRIOR ART

In spite of perpetually increasing processing speeds, the need for optical character recognition (OCR) readers that are programmed to efficiently search captured image data for recognizable indicia and to recognize such indicia has not diminished.

The increase in processing speeds has been accompanied by multiplication of the resolution of imaging arrays, and a corresponding multiplication of the number of processing operations required to process images captured by optical readers. The availability of higher processing speeds and higher resolution imaging systems, in turn, has encouraged users of OCR readers to develop OCR applications requiring an ever increasing number of processing operations.

In addition to being too slow for their designated applications, OCR readers have been observed to be poorly equipped to recognize characters obliquely oriented in a captured image. Existing optical readers generally require a specific orientation of a reader relative to a character during image capture for efficient recognition of a character.

There is a need for a faster OCR reader which provides omnidirectional character recognition.

SUMMARY OF THE INVENTION

According to its major aspects and broadly stated, the invention is a method for omnidirectional recognition of recognizable characters in a captured two-dimensional image.

An optical reader configured in accordance with the invention searches for pixel groupings along paths in a starburst pattern, and subjects each located pixel grouping to a preliminary edge crawling process which records the count of edge pixels and records the pixel positions of the grouping's edge so that the size and center of the grouping can be estimated. If two similar-sized pixel groupings are located that are of sizes sufficient to potentially represent recognizable characters, then the reader launches "alignment rails" at pixel positions substantially parallel to a center line connecting the center points of the two similarly sized groupings. The alignment rails define an area within the image likely to include a plurality of recognizable characters of a linear string of characters. The presence of clear areas above and below a pair of similarly and sufficiently sized pixel groupings extending at least the length of a minimal sequence of OCR characters indicates a likelihood that the pair of pixel groupings belong to a linear string of OCR characters.

A reader according to the invention, therefore, searches for recognizable characters along the rail area centerline, and subjects pixel groupings within the rail area to a shape-characterizing edge crawling process for developing data that characterizes the shape of a pixel grouping's edge. Prior to comparison of the shape-characterizing data with stored reference data, the reader adjusts the orientation representation of the developed data by an offset orientation value determined by the orientation of the rails. For pixel groupings within the rail area, the reader compares the developed shape-characterizing data to previously stored reference shape-characterizing data to determine the character represented by the grouping on the basis of the best fit data. These and other details, advantages and benefits of the present invention will become apparent from the detailed description of the preferred embodiment herein below.

BRIEF DESCRIPTION OF THE DRAWINGS

FIGS. 4a-4d illustrate an example of an image including recognizable characters which may be processed according to the invention;

FIG. 5a illustrates an example of a data format for pixel grouping shape-characterizing data, which may be developed according to the invention;

FIG. 5b is an example of a matrix of stored reference data;

FIG. 5c illustrates a reference character from which stored reference data may be developed.

DETAILED DESCRIPTION OF THE INVENTION

Figure 1A:
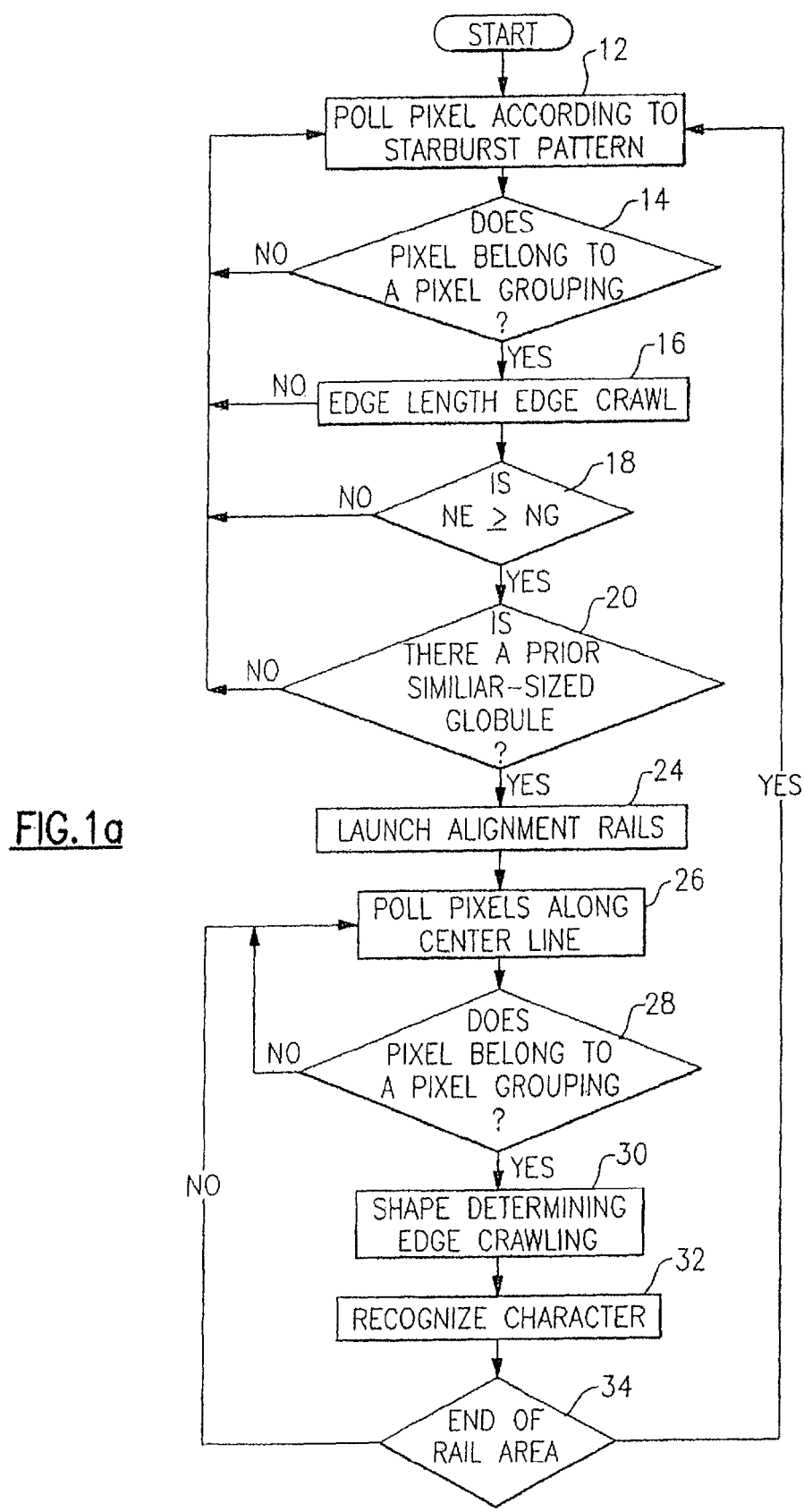
FIG. 1a is a flow diagram representing the ordering of operations carried out by an OCR optical reader according to the invention.

A flow diagram of the main character recognition algorithm of the present invention for locating and recognizing recognizable characters is shown in FIG. 1a. At block 12 searching for a pixel grouping in a captured image proceeds according to a starburst pattern. According to a starburst search, a reader polls pixels at positions of generally increasing distances from a starburst center position in varying directions from a center position until a first pixel grouping is found at block 14. When a first pixel grouping is found, the reader subjects the pixel grouping to an edge length determining edge crawling process for estimating the size of the grouping based on the length of the pixel grouping's edge. The reader at block 18 then determines if the pixel grouping's edge is of sufficient length to represent a potentially recognizable character. Pixel groupings having edges of length sufficient to potentially represent a recognizable character are referred to herein as "globules." If the pixel grouping at block 18 is determined to be a globule, then the reader at block 20 determines if another similarly sized globule has previously been identified in the present captured image representation. The reader may estimate the sizes of a pair of globules at block 20 by a method that includes the step of monitoring each globule's highest and lowest x position and highest and lowest y position.

If a prior similar-sized globule is located, then the reader at block 24 launches "alignment rails" substantially parallel to a center line connecting the center points of the similar-sized globules. The term "substantially parallel" herein encompasses relative positions that are in fact parallel. The launched alignment rails are useful for identifying additional characters of a linear string of characters in a captured image and for establishing an orientation of the character string. At block 26, the reader polls pixels along the center line starting at the left bound edge of the area defined by the alignment rails until a pixel grouping in the rail area is located at block 28.

When a pixel grouping within the rail area is located, the reader at block 30 subjects the pixel grouping to a shape determining edge crawling process. In a shape-characterizing edge crawling process, the reader develops data that characterizes the shape of a pixel grouping's edge and processes the shape-characterizing data into a form so that the data can be compared to stored reference data. Importantly, if the rails are obliquely oriented, the reader adjusts the orientation representation of the shape-characterizing data by an offset value determined by the orientation of the rails.

The reader at block 32 then compares the developed shape-characterizing data for the present globule to stored shape-characterizing data for several characters to determine the character represented by the globule by selecting the best fit data of the stored shape-characterizing data database. The reader continues to poll pixels along the rail area center line and continues to attempt to recognize characters represented by located pixel groupings until at block 34 the reader determines that the end of the rail area has been reached.

Figure 2A:
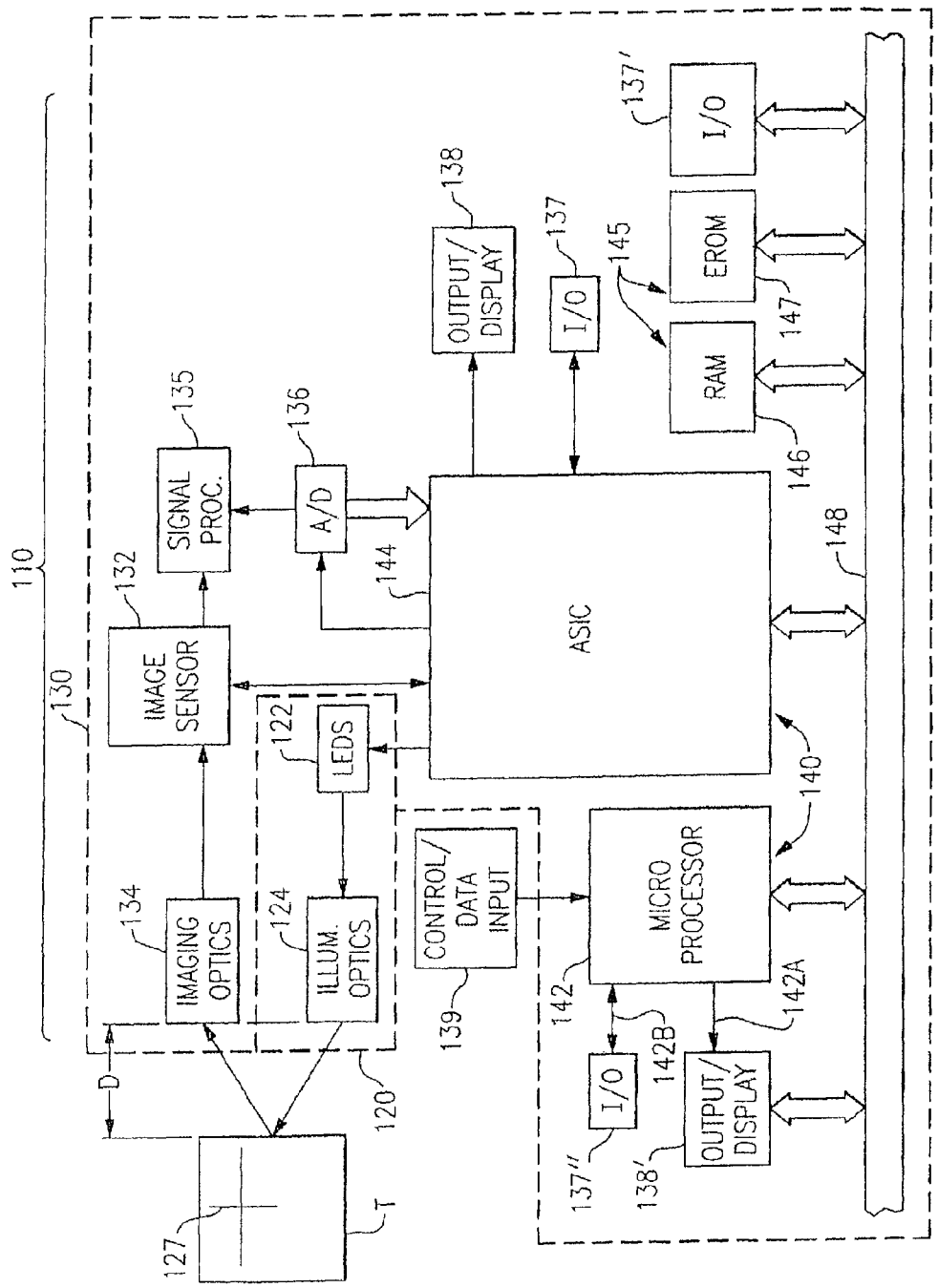
FIG. 2a is a block diagram of an exemplary optical reader that may be configured according to the invention.
Figure 2B:
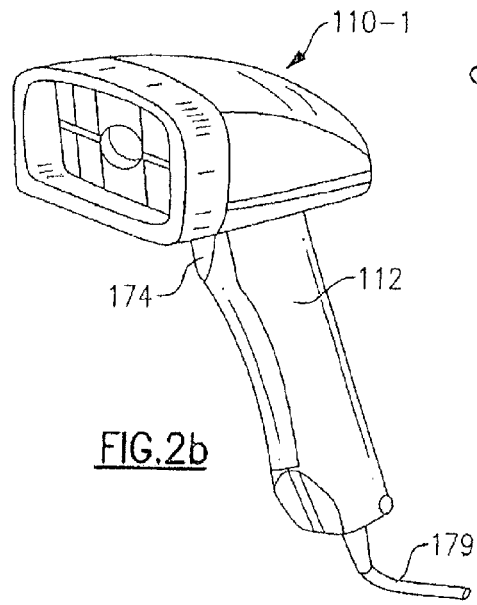
FIGS. 2b-2h illustrate various types of optical readers in which the invention may be incorporated.
Figure 2C:
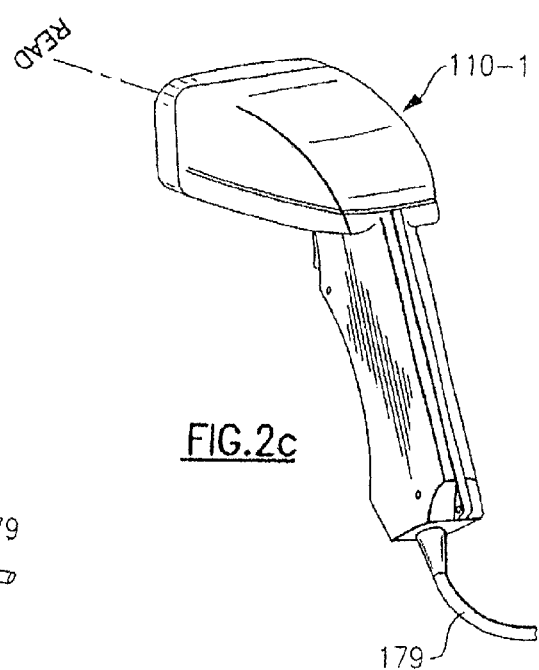
Figure 2D:
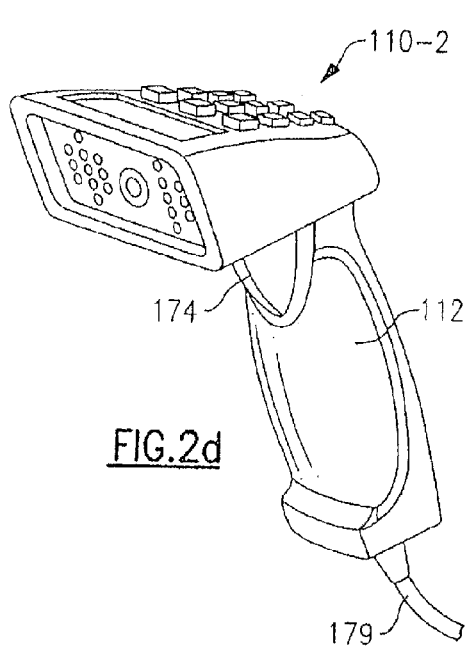
Figure 2E:
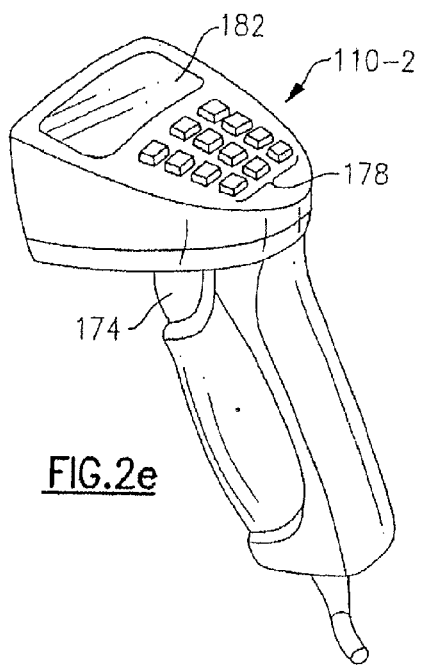
Figure 2F:
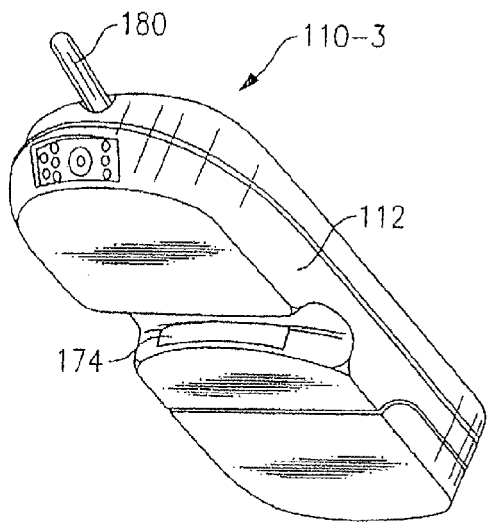
Figure 2G:
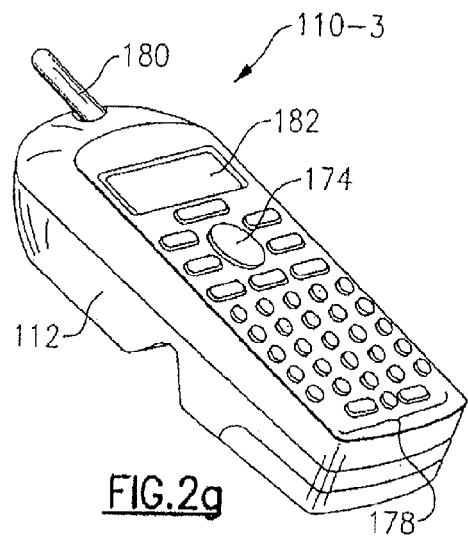

A block diagram of an exemplary optical reader which may be employed to carry out the invention is shown in FIG. 2*a*.

Optical reader 110 includes an illumination assembly 120 for illuminating a target object T, such as a 1D or 2D bar code symbol, and an imaging assembly 130 for receiving an image of object T and generating an electrical output signal indicative of the data optically encoded therein. Illumination assembly 120 may, for example, include an illumination source assembly 122, such as one or more LEDs, together with an illuminating optics assembly 124, such as one or more lenses, diffusers, wedges, and reflectors or a combination of such elements for directing light from light source 122 in the direction of target object T. Illumination assembly 120 may include target illumination and optics for projecting an aiming pattern 127 on target T. Illumination assembly 20 may comprise, for example, laser or light emitting diodes (LEDs) such as white LEDs or red LEDs. Illumination assembly 120 may be eliminated if ambient light levels are certain to be high enough to allow high quality images of object T to be taken. Imaging assembly 130 may include an image sensor 132, such as a 1D or 2D CCD, CMOS, NMOS, PMOS, CID OR CMD solid state image sensor, together with an imaging optics assembly 134 for receiving and focusing an image of object T onto image sensor 132. The array-based imaging assembly shown in FIG. 2*a* may be replaced by a laser array based imaging assembly comprising multiple laser sources, a scanning mechanism, emit and receive optics, at least one photodetector and accompanying signal processing circuitry.

Optical reader 110 of FIG. 2*a* also includes programmable control circuit 140 which preferably comprises an integrated circuit microprocessor 142 and an application specific integrated circuit (ASIC 144). The function of ASIC 144 could also be provided by field programmable gate array (FPGA). Processor 142 and ASIC 144 are both programmable control devices which are able to receive, output and process data in accordance with a stored program stored in memory unit 145 which may comprise such memory elements as a read/write random access memory or RAM 146 and an erasable read only memory or EROM 147. RAM 146 typically includes at least one volatile memory device but may include one or more long term non-volatile memory devices. Processor 142 and ASIC 144 are also both connected to a common bus 148 through which program data and working data, including address data, may be received and transmitted in either direction to any circuitry that is also connected thereto. Processor 142 and ASIC 144 differ from one another, however, in how they are made and how they are used.

More particularly, processor 142 is preferably a general purpose, off-the-shelf VLSI integrated circuit microprocessor which has overall control of the circuitry of FIG. 2*a*, but which devotes most of its time to decoding image data stored in RAM 146 in accordance with program data stored in EROM 147. Processor 144, on the other hand, is preferably a special purpose VLSI integrated circuit, such as a programmable logic or gate array, which is programmed to devote its time to functions other than decoding image data, and thereby relieve processor 142 from the burden of performing these functions.

The actual division of labor between processors 142 and 144 will naturally depend on the type of off-the-shelf microprocessors that are available, the type of image sensor which is used, the rate at which image data is output by imaging assembly 130, etc. There is nothing in principle, however, that requires that any particular division of labor be made between processors 142 and 144, or even that such a division be made at all. This is because special purpose processor 144 may be eliminated entirely if general purpose processor 142 is fast enough and powerful enough to perform all of the functions contemplated by the present invention. It will, therefore, be understood that neither the number of processors used, nor the division of labor there between, is of any fundamental significance for purposes of the present invention.

With processor architectures of the type shown in FIG. 2*a*, a typical division of labor between processors 142 and 144 will be as follows. Processor 142 is preferably devoted primarily to such tasks as recognizing characters represented in stored image data according to the optical character recognition (OCR) scheme described herein, decoding decodable symbols such as bar code symbols, handling menuing options and reprogramming functions, processing commands and data received from control/data input unit 139 which may comprise such elements as trigger 174 and keyboard 178 and providing overall system level coordination.

Processor 144 is preferably devoted primarily to controlling the image acquisition process, the A/D conversion process and the storage of image data, including the ability to access memories 146 and 147 via a DMA channel. Processor 144 may also perform many timing and communication operations. Processor 144 may, for example, control the illumination of LEDs 122, the timing of image sensor 132 and an analog-to-digital (A/D) converter 136, the transmission and reception of data to and from a processor external to reader 110, through an RS-232, a network such as an Ethernet, a serial bus such as USB, a wireless communication link (or other) compatible I/O interface 137. Processor 144 may also control the outputting of user perceptible data via an output device 138, such as a beeper, a good read LED and/or a display monitor which may be provided by a liquid crystal display such as display 182. Control of output, display and I/O functions may also be shared between processors 142 and 144, as suggested by bus driver I/O and output/display devices 137' and 138' or may be duplicated, as suggested by microprocessor serial I/O ports 142A and 142B and I/O and display devices 137" and 138'. As explained earlier, the specifics of this division of labor is of no significance to the present invention.

FIGS. 2b through 2g show examples of types of housings in which the present invention may be incorporated. FIGS. 2b-2g show 1D/2D optical readers 110-1, 110-2, and 110-3. Housing 112 if each of the optical readers 110-1 through 110-3 is adapted to be graspable by a human hand and has incorporated therein at least one trigger switch 174 for activating image capture and decoding and/or image capture and character recognition operations. Readers 110-1 and 110-2 include hard-wired communication links 179 for communication with external devices such as other data collection devices or a host processor, while reader 110-3 includes an antenna 180 for providing wireless communication with a device or a host processor.

In addition to the above elements, readers 110-2 and 110-3 each include a display 182 for displaying information to a user and a keyboard 178 for enabling a user to input commands and data into the reader.

Figure 2H:
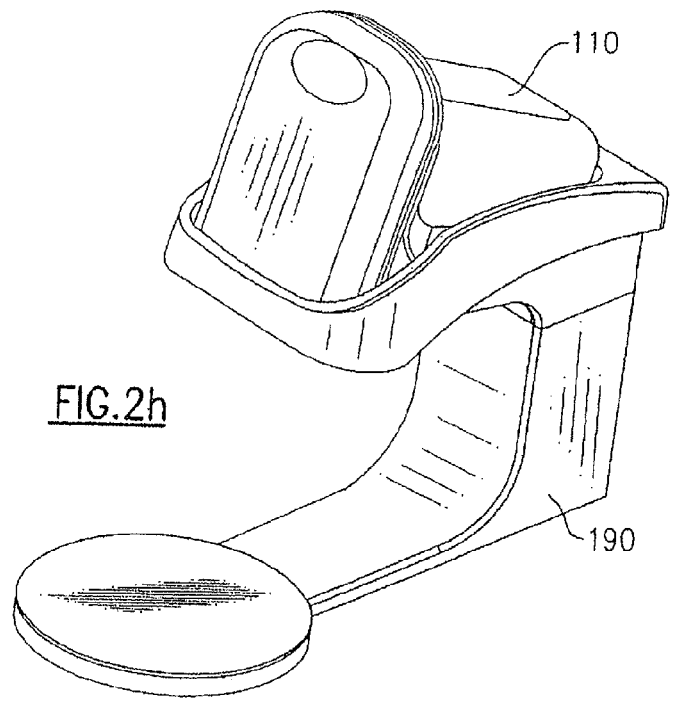

Any one of the readers described with reference to FIGS. 2b-2g may be mounted in a stationary position as is illustrated in FIG. 2h showing a generic optical reader 110 docked in a scan stand 190. Scan stand 190 adapts portable optical reader 110 for presentation mode scanning. In a presentation mode, reader 110 is held in a stationary position and an indicia bearing article is moved across the field of view of reader 110.

As will become clear from the ensuing description, the invention need not be incorporated in a portable optical reader. The invention may also be incorporated, for example, in association with a control circuit for controlling a nonportable fixed mount imaging assembly that captures image data representing image information formed on articles transported by an assembly line, or manually transported across a checkout counter at a retail point of sale location.

Referring now to aspects of the recognition algorithm of the invention in greater detail, a starburst search process is more fully explained with reference to FIG. 1b. Most optical readers include an aiming pattern 127 that encourages an operator of an optical reader to center a symbol in a frame of a captured image. Therefore, when images are captured that include recognizable indicia, it is normally more likely that the recognizable indicia will be at a center of a captured image than toward the periphery of a captured image. For efficient locating of a recognizable character which is likely to be at a center of a frame of image data, starburst searching may proceed by polling pixel positions beginning with an image's center pixel. Of course, the position of the starburst pattern center pixel, p0, can be adjusted to a position away from an image's center. It may be desirable to adjust the position of the starburst pattern center pixel, p0, in the case that, because of a specific reader configuration or reader application, an aiming pattern of a reader is not projected onto a center of a reader's field of view.

Figure 1B:
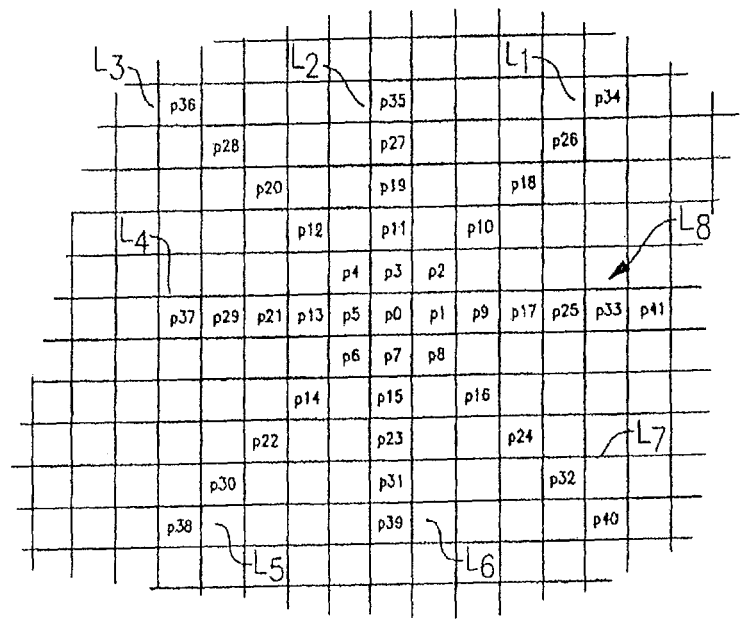
FIG. 1b is partial image map illustrating a starburst search pattern.

As illustrated in FIG. 1b control circuit 140 during a starburst search first polls center pixel, p0 and then polls a succession of pixels p1, p2, p3 . . . according to a starburst pattern. The pixels of the starburst pattern are preferably located a plurality of evenly spaced apart directions relative to starburst center pixel p0 and each successive pixel, p1, p2, p3 . . . is preferably at a distance from center pixel p0 that is equal to or greater than the distance of the preceding starburst pixel to the center pixel, p0. The pixels of the starburst pattern are conveniently defined along evenly spaced apart lines $l_0$-$l_7$ that extend radially outwardly from center pixel p0.

Searching for pixel groupings in a starburst pattern terminates temporarily when a first pixel grouping is found. The term "pixel grouping" herein refers to a grouping of one or more adjacent (including diagonally adjacent) like valued pixels, typically dark pixels. In order for a "dark" pixel to be recognized in an image, there must be a prior determination of what constitutes a dark pixel. Prior determination of what constitutes a "dark" pixel is normally carried out by binarization of at least a part of an image; that is, representation of a "dark" pixel by a one bit logic "0" value, and representation of a "light" pixel by a one bit logic "1" value (although the opposite convention can be adopted). It will be understood that image binarization referred to herein may be carried by a variety of different methods. For example, an image may be binarized by capturing a binary image comprising one bit "1" or "0" pixel values directly into memory 145 when an initial image map is captured. Alternatively, a grey scale image map may be captured into memory 145 and the pixel values therein may subsequently be converted into one bit binary values. An entire frame of grey scale values may be subjected to binarization prior to searching for indicia represented in the captured image, or else individual pixels of the image map may be binarized "on demand" when they are analyzed.

Figure 1C:
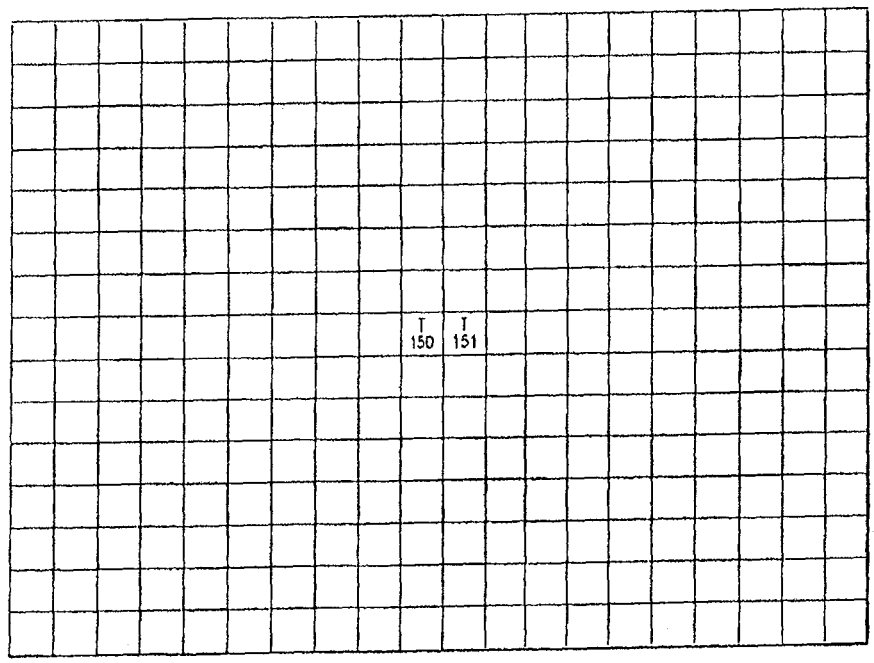
FIG. 1c is an image map shown as being divided into tiles.

In addition, pixels of a grey scale image map may be binarized according to a "tile-binarization" process that is described with reference to FIG. 1c. In a "tile binarization" process, control circuit 140 divides the initial image map into a predetermined number of "tiles" as are indicated in FIG. 1c., each comprising a predetermined number of pixels. The tiles may be of any size or shape, and do not have to be similarly sized or shaped. It is convenient, however, to define each tile to be of equal size. Each tile may comprise a 32×32 pixel block, for example.

According to the tile binarization process, control circuit 140 does not binarize an entire image map prior to searching for recognizable indicia. Instead, in a tile binarization process, control circuit 140 binarizes a tile of an image map only when at least one pixel of the tile is needed for image data analysis. For example, at the time starburst searching commences, control circuit 140 may binarize only center tiles T150, and T151, as indicated by FIG. 1C.

In addition to binarizing tiles during starburst searching, control circuit 140 may binarize new tiles during other image data processing steps such as during an edge crawling step, to be described more fully hereinbelow, or during an alignment rail area search for recognizable indicia to be described more fully hereinbelow. Control circuit 140 may binarize a new tile when control circuit 140 is required to read a first pixel of the new tile or when control circuit 140 reads a previously binarized pixel value in positional proximity with the new tile. For example, control circuit 140 may binarize a new tile when control circuit 140 reads a pixel value corresponding to a pixel that borders the new tile.

In another aspect of a tile binarization process, the particular type of binarization process executed by control circuit 140 in binarizing a tile of pixel values may be made to vary depending on the type of image data processing presently being carried out by control circuit 140. In one embodiment of the invention, control circuit 140 is made to binarize new tiles as is necessary according to a low resolution binarization process when searching for pixel groupings, or when subjecting a pixel grouping to an edge-length determining edge crawling process to be described more fully herein and to binarize tiles of pixels as is necessary according to a high resolution binarization process when subjecting a pixel grouping to a shape-characterizing edge crawling process as will be described herein.

Figures 1D, 1E:
FIGS. 1d-1e are diagrams for illustrating a possible binarization process which may be utilized with the invention.

In a low resolution binarization process, control circuit 140 converts each grey scale value of a tile into a binary "1" or "0" value. In a high resolution binarization process described with reference to FIGS. 1*d* and 1*e*, control circuit 140 interpolates "constructed" grey scale values for constructed pixel positions intermediate existing pixel positions prior to converting both the existing grey scale values and constructed pixel grey scale values to one bit "1" or "0" values. As indicated in FIG. 1*e*, constructed pixel values for side adjacent constructed pixels, e.g. pixels P1 and P2, may be developed by averaging the grey scale values of side adjacent original pixels, P1 and P2. Constructed pixel values for diagonally adjacent constructed pixels, e.g. pixel P1, P2, P5 and P6, may be developed by averaging the grey scale values of the diagonally adjacent original pixels, P1, P2, P5, and P6.

In the above-described embodiment it will be recognized that control circuit 140 may binarize certain tiles according to a high resolution binarization process during execution of shape-characterizing edge crawl which have previously been binarized according to a low resolution binarization process (during searching or length determining edge crawling).

If control circuit 140 may construct both low resolution and high resolution binarized image maps corresponding to the same position of a grey scale image map, then control circuit 140 may store both of these binary representations into memory 145 in a manner such that certain cells of the memory store bits corresponding to both of the low and high resolution binary representations. It is seen with reference again to FIGS. 1*d* and 1*e* that every other pixel of every other row of a high resolution interpolated image map, as shown in FIG. 1*e* is identical to a pixel value of the low resolution image map from which it has been interpolated, as shown in FIG. 1*d*. In an embodiment of the invention featuring improved memory conservation and processing speed, control circuit 140 stores low resolution binary image data into memory cell locations allocated to contain a high resolution binary image, and "fills in" the missing bits of the high resolution image (such as bits corresponding to constructed pixels P1-2, P2-3, P3-4, P1-5 . . . as shown in FIG. 4) if and when the region of the image is subjected to high resolution binarization. In such an embodiment, control circuit 140 is made to skip over memory space locations allocated to contain "constructed value" bits when processing low resolution binary image data (such as when searching for decodable indicia).

Threshold values for use in binarizing grey scale image data may be developed utilizing a variety of different methodologies. Threshold values may be predetermined based on known illumination or exposure conditions. Threshold values may also be based on grey scale values of a threshold-determining frame of image data, which is typically the frame of image data being processed when the reader is of a type adapted for used in variable illumination conditions.

In calculating threshold values based on present or recently captured image data, control circuit 140 may consider every pixel of an image map. However, for increased processing speed, control circuit 140 may be adapted to sample a limited number of threshold-determining pixel values (such as $\frac{1}{256}$ of pixels of the entire image map) at substantially evenly spaced apart pixel position for use in determining a similar number of threshold values for an image map (in a tile-binarization scheme implemented with a typically sized image map, this number of thresholds would result in a limited number, for example 4, threshold values being calculated for each tile). This set of grey scale values may be referred to as a sample array of threshold-determining values.

Preferably, the threshold value for use in binarizing a grey scale value at a given pixel position takes into consideration grey scale values of pixels of the threshold-determining frame in positional proximity to the given pixel position preferentially to grey scale values to pixel positions not in positional proximity with the given pixel.

Skilled artisans will recognize that numerous alternative methods are possible for ensuring that a threshold value at a given pixel position depends preferentially on pixel values of neighboring pixels. According to one method for developing threshold values that depend preferentially on the value of neighboring pixels, control circuit 140 may develop the threshold value at each pixel position of a threshold determining image map by calculating the average of the grey scale value at that pixel and of a predetermined arrangement of surrounding pixels. Likewise, control circuit 140 may develop a threshold value for a group of pixels corresponding to a given position in a sample array of threshold determining values by averaging the threshold determining value at the given position and threshold-determining values at positions surrounding the given position.

Figure 1F:
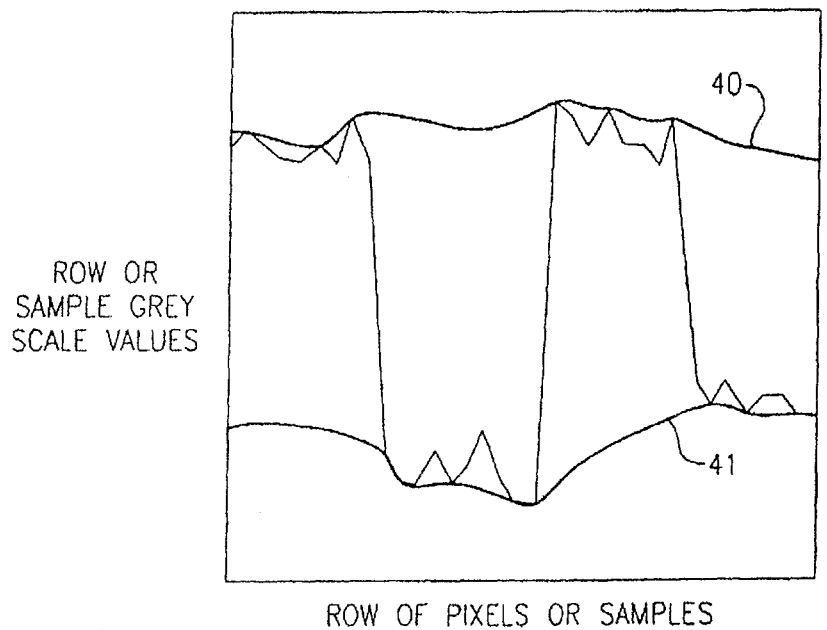
FIGS. 1f-1g are diagrams for illustrating a possible threshold determining process which may be utilized with the invention.
Figure 1G:
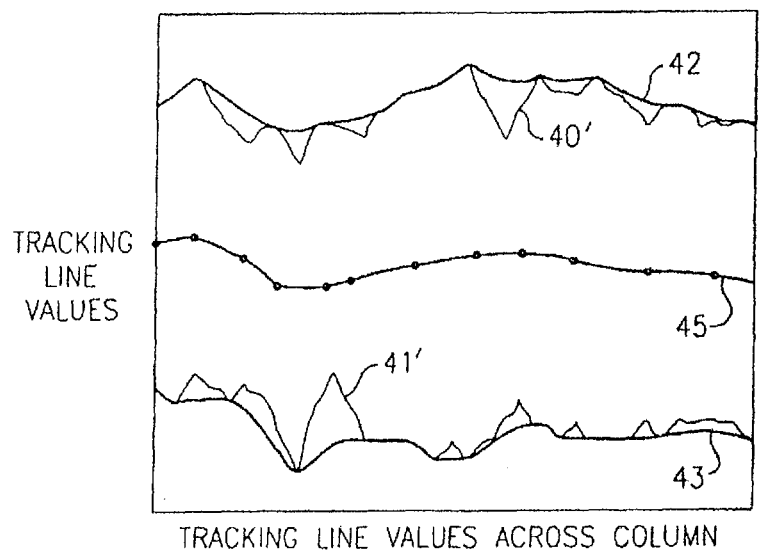
Figure 3A:
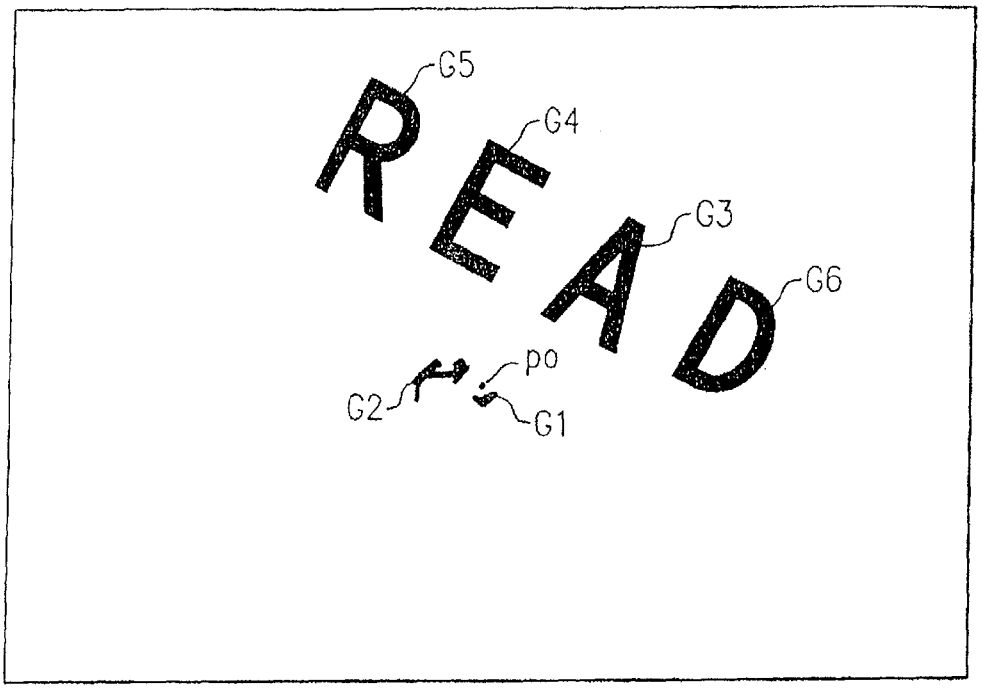
FIG. 3a-3g are partial image maps illustrating an undecodable pixel grouping and a decodable pixel grouping as may be subjected to image data processing according to the invention.

Another method for determining threshold values that depend preferentially on grey scale values of neighboring pixels is described with reference to FIGS. 1*f* and 1*g*. As illustrated in FIG. 1*e*, control circuit 140 may employ one of a variety of known mathematical algorithms to develop row maximum and minimum tracking lines 40 and 41 which track, respectively, local maxima and local minima grey scale values across a row of pixels, or a row of threshold-determining values in case threshold values for various pixel positions are being determined from a sample array of threshold determining values. As indicated in FIG. 1*g*, control circuit 140 may then analyze the row tracking line data to develop 2D maximum and minimum tracking lines 42 and 43 which track, respectively, changes in the row maximum tracking line data 40' and row minimum tracking line data 41' across each column of the pixel or sample array. Control circuit 140 may then develop for each column of a pixel or sample array a 2D threshold line 45 as the midpoint between the 2D maximum and minimum tracking lines 42 and 43 for use in determining threshold values at various pixel positions in the image map. Further aspects of the character recognition algorithm of the present invention are described with reference to FIG. 3*a* showing, in low resolution, a first pixel grouping G1 corresponding to an unrecognizable indicia as may result from an extraneous marking being in the target area or a particle on an optical element of a reader during image capture, a second pixel grouping G2 corresponding to a second unrecognizable indicia, and third, fourth, fifth and sixth pixel groupings G3, G4, G5, and G6, each corresponding to a recognizable character. It will be seen that when analyzing scenes as shown in FIG. 3 having both unrecognizable, and recognizable indicia located radially outwardly from the non-recognizable indicia, a reader according to the invention analyzes a limited amount of image data to determine that an unrecognizable indicia is, in fact, likely unrecognizable, before analyzing a limited amount of image data to determine that the recognized indicia is of a type that is likely recognizable. Application of the character recognition rules introduced relative to the flow diagram of FIG. 1a are described as being applied herein relative to the captured image illustrated in FIG. 3a.

If p0 in the image map of FIG. 3a is at the center pixel, and control circuit 140 polls pixel values according to the starburst pattern of FIG. 1b then the first dark pixel analyzed will be dark starburst pixel P31. When dark starburst pixel P31 is found, an edge of a pixel grouping to which first dark pixel belongs is subjected to a length-determining edge crawling process according to the invention for developing numerical data, which, as will be explained determines the number of pixels bordering the edge of the pixel grouping and the positions of these pixels which border the groupings edge. Edge crawling may comprise analysis either of dark or light pixels of the dark-to-light border defined by a pixel grouping such as pixel grouping, G1. Pixels which define an edge of a pixel grouping may be referred to as "edge pixels." It will be seen that if the first starburst pixel, p0, is a dark pixel (that is, within a pixel grouping), then control circuit 140 must first locate an edge transition of the grouping (for example by proceeding with a starburst search until a light pixel is found) prior to subjecting the grouping to an edge length determining edge crawling process at block 16.

In executing a length determining edge crawling process (block 16), control circuit 140 counts the number of the pixel grouping's edge pixels and records the position of each edge pixel. In the specific example described, edge pixels are considered the light pixels that border the groupings dark pixels.

In order to count a sequence of edge pixels, control circuit 140 must first establish an initial traveling direction, and then follow a set of edge crawling rules. A possible set of rules for establishing an initial traveling direction is as follows:

(A) if there is a dark pixel E or SE of the first edge pixel and the pixel S of the first edge pixel is light, then the initial traveling direction is N;

(B) else if there is a dark pixel S or SW of the first edge pixel and the pixel W of the first edge pixel is light, then the initial traveling direction is E;

(C) else if there is a dark pixel W or NW of the first edge pixel and the pixel N of the first edge pixel is light, then the initial traveling is S;

(D) else if there is a dark pixel N or NE of the first edge pixel and the pixel E of the first edge pixel is light, then the initial traveling direction is W; where N=North, S=South, E=East, W=West.

(E) else edge crawling fails.

Edge crawling fails under condition (E) if there is no dark pixel neighboring the first edge pixel (violating the starting condition) or if the first edge pixel is completely surrounded by dark pixels.

Figure 3G:
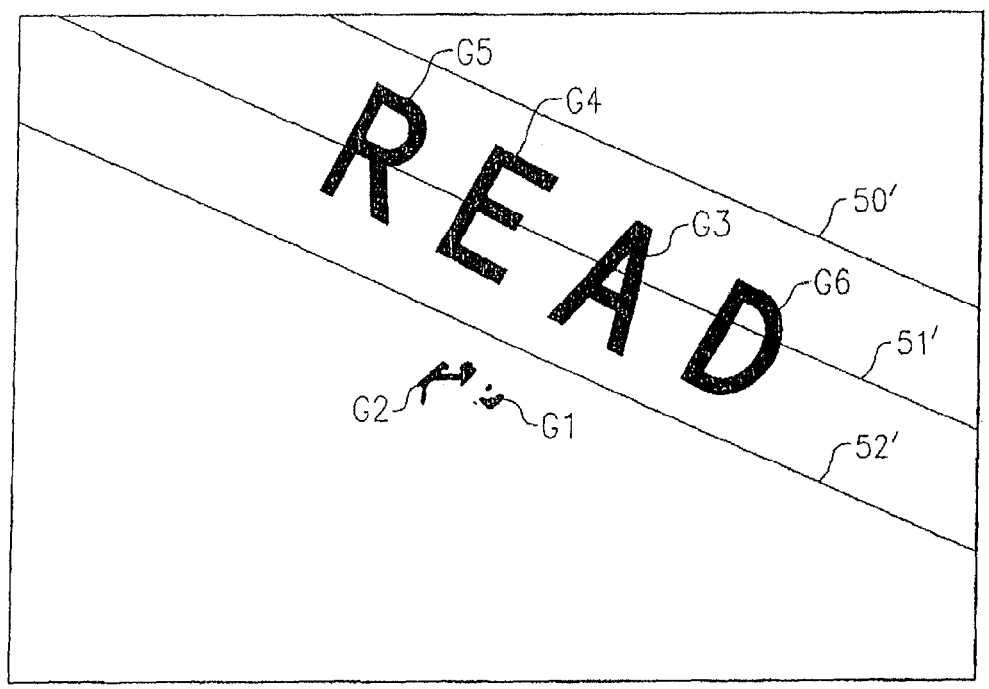
Figure 3B:
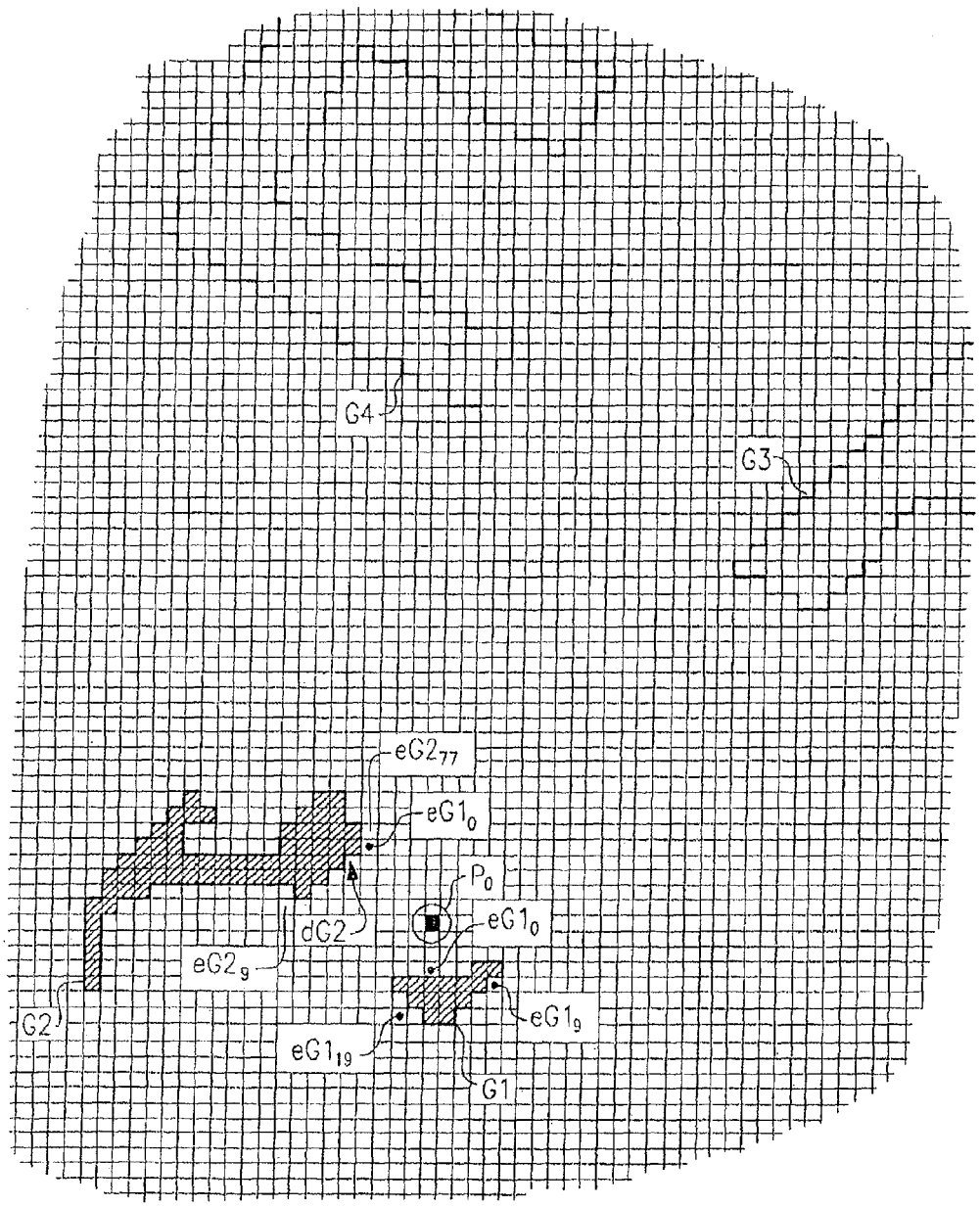

In the example of FIG. 3a-3b, the first dark pixel of pixel grouping G1 is pixel $eG1_0$. Following the above direction initialization rules, Rule (B) above applies and the initial traveling direction is E. After establishing an initial traveling direction, control circuit 140 counts the number of edge pixels of the edge. The sequence of edge pixels established during the edge length determining edge crawling process may be established according to the following set of edge crawling rules:

if the pixel looking rightward relative to the current direction is light, turn right, advance to that light pixel location;

else if the pixel straight ahead is light, advance to it;

else if the pixel looking leftward relative to the current traveling direction is light, advance to it;

else turn backward, and "advance" to the single neighboring light pixel.

As control circuit 140 determines the position of each new edge pixel, control circuit 140 records the pixel position of the edge pixel into memory 145 and increments an edge pixel counter.

It should be highlighted that the above moves are made relative to the current traveling direction. If having reached the present position by traveling South for example, then the order of checking is (1) is West light, then turn and move West, else (2) is South light, then move South, else (3) is East light, then turn and move East, else (4) turn and move North. Because the above edge crawling rules result in the direction of crawling advancing rightward of the present direction whenever there is a light pixel neighboring the present edge pixel, they may be referred to herein as "right" edge crawling rules. "Left" edge crawling rules can also readily be developed, as will be explained herein.

Following the above edge crawling rules, control circuit 140 determines the sequence of edge pixels for pixel grouping G1 to be: $eG1_0$, $eG1_1$, $eG1_2$ ... $eG1_{25}$ as is illustrated in FIG. 3b. Length-determining edge crawling terminates when a complete loop around a grouping's edge has been made, that is, when the present edge pixel $e_N$ is the initial edge pixel, $e_0$.

Referring again to the main recognition algorithm flow diagram of FIG. 1a, control circuit 140 at block 12 determines that a pixel grouping is not of a size sufficient to correspond to a recognizable character if the edge length of the grouping is below a predetermined length. Pixel grouping G1 in the example of FIG. 3a includes only 26 edge pixels (NE=26). Accordingly, control circuit 140 will likely determine that the edge of pixel grouping G1 is not of sufficient length to constitute a recognizable character and will revert to block 12 to search for another edge pixel. A typical value for NG, the minimum number of edge pixels considered to potentially constitute a recognizable character is NG=40. Pixel groupings having a count of edge pixels equal to or above NG which potentially constitute recognizable characters are considered "globules" herein.

Continuing to search for pixel groupings in a starburst pattern, the next dark pixel encountered by control circuit 140 following the starburst pattern of FIG. 1b is dark starburst pixel dG2 of pixel grouping G2. The first edge pixel of grouping G2 is edge pixel $eG2_0$. Following the above direction initialization and edge crawling rules control circuit 140 at block 16 determines the edge pixels of pixel group G2 to be the edge pixels $eG2_0$, $eG2_1$, $eG2_2$, ... $eG2_{77}$ as is indicated in FIG. 3b. Control circuit 140 further determines the count of edge pixel of Group G2 to be $COUNT_{G2}=78$. Because COUNT G2≥NE, control circuit 140 proceeds to block 20 to determine if there is a prior globule of size similar to that of globule G2. However, because grouping G2 is the first located globule, then control circuit 140 proceeds to block 12 to poll additional starburst pixels after executing block 20.

Figure 3C:
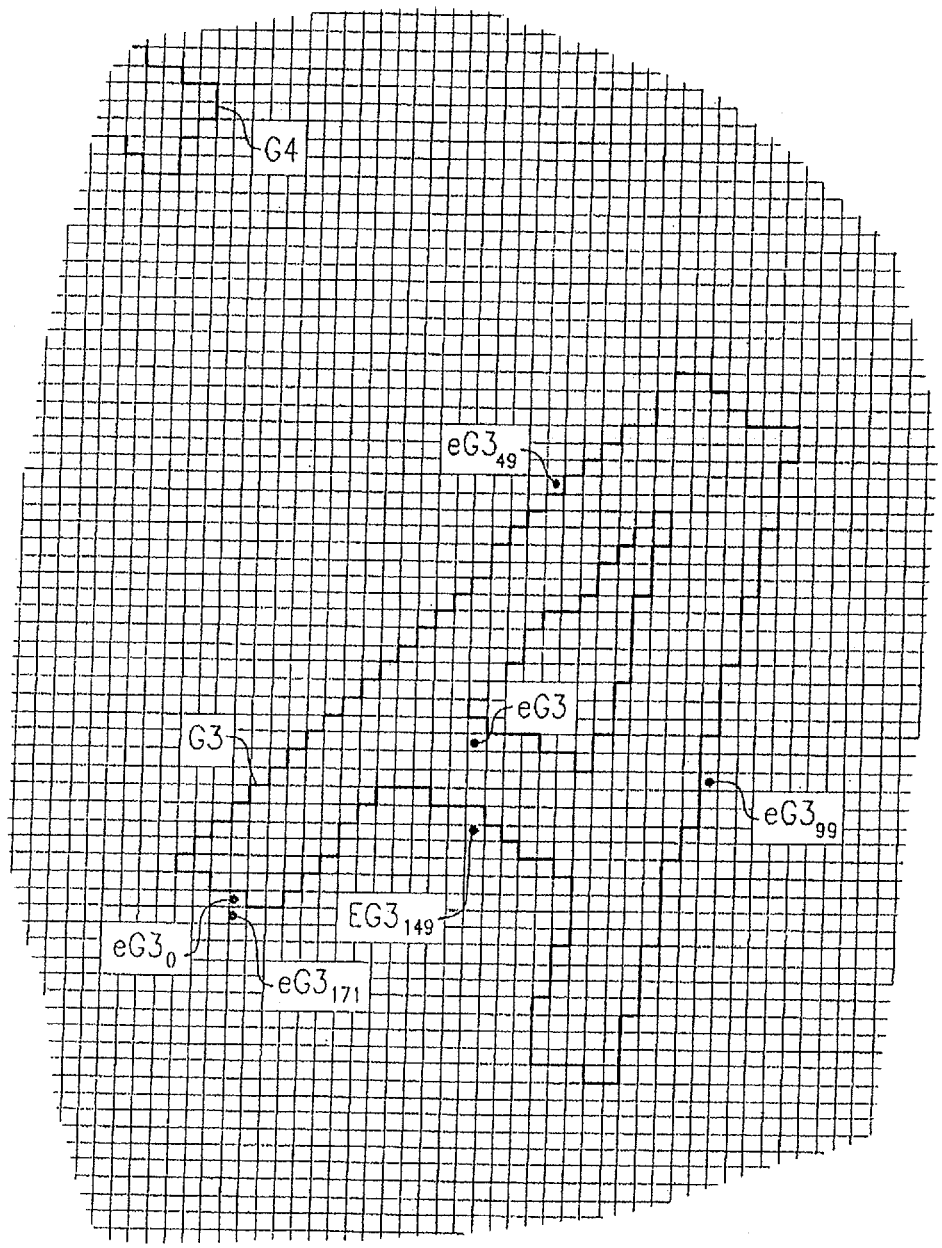

The next pixel grouping that is found pursuant to starburst searching is pixel grouping G3. Following the above traveling direction initialization and edge crawling rules, control circuit 140 at block 16 determines the edge pixels of grouping G3 to be edge pixels $eG3_0$, $eG3_1$, $eG3_2$ ... $eG3_{171}$ as is indicated in FIG. 3C, determines the count of edge pixels to be $COUNT_{G3}=172$. Control circuit 140 determines at block 18 that pixel grouping G3 has an edge length sufficient to be a globule, and at block 20 determines whether control circuit 140 has previously located a globule of size-similar to that of globule G3. Because the edge length of pixel grouping G2 is large enough to constitute a globule, control circuit 140 at block 20 determines whether globules G3 and G2 are of similar size.

Control circuit 140 may determine at block 20 whether the sizes of globules G3 and G2 are similar by monitoring the highest and lowest x-axis positions and the highest and lowest y-axis positions of the globule. For example, control circuit 140 may estimate the size of a globule according to the formula:

$$\text{ESIZE}_{GLOBULE} = (X(\text{hi}) - X(\text{lo})) + (Y(\text{hi}) - Y(\text{lo})) \quad \text{eq. 1}$$

Further, control circuit 140 may determine whether the sizes of two globules are similar on the basis of whether the size estimations of the two globules as estimated by eq. 1 are within a predetermined percent age, such as +−12.5 percent. Employing eq. 1 to estimate the size of globule G2, and globule G3, respectively, then $$\text{ESIZE}_{G2} = (eG2_{69} - eG2_{22}) + (eG2_{62} - eG2_{20}) = 19 + 15 = 34$$

$$\text{ESIZE}_{G3} = (eG3_{70} - eG3_{5}) + (eG3_{62} - eG3_{121}) = 36 + 43 = 77$$

Because the sizes of globules G2 and G3 do not correlate with one another according to the described criteria, control circuit 140, after executing block 20 (size comparison) proceeds again to block 12 to continue polling pixels according to a starburst search pattern.

Figure 3D:
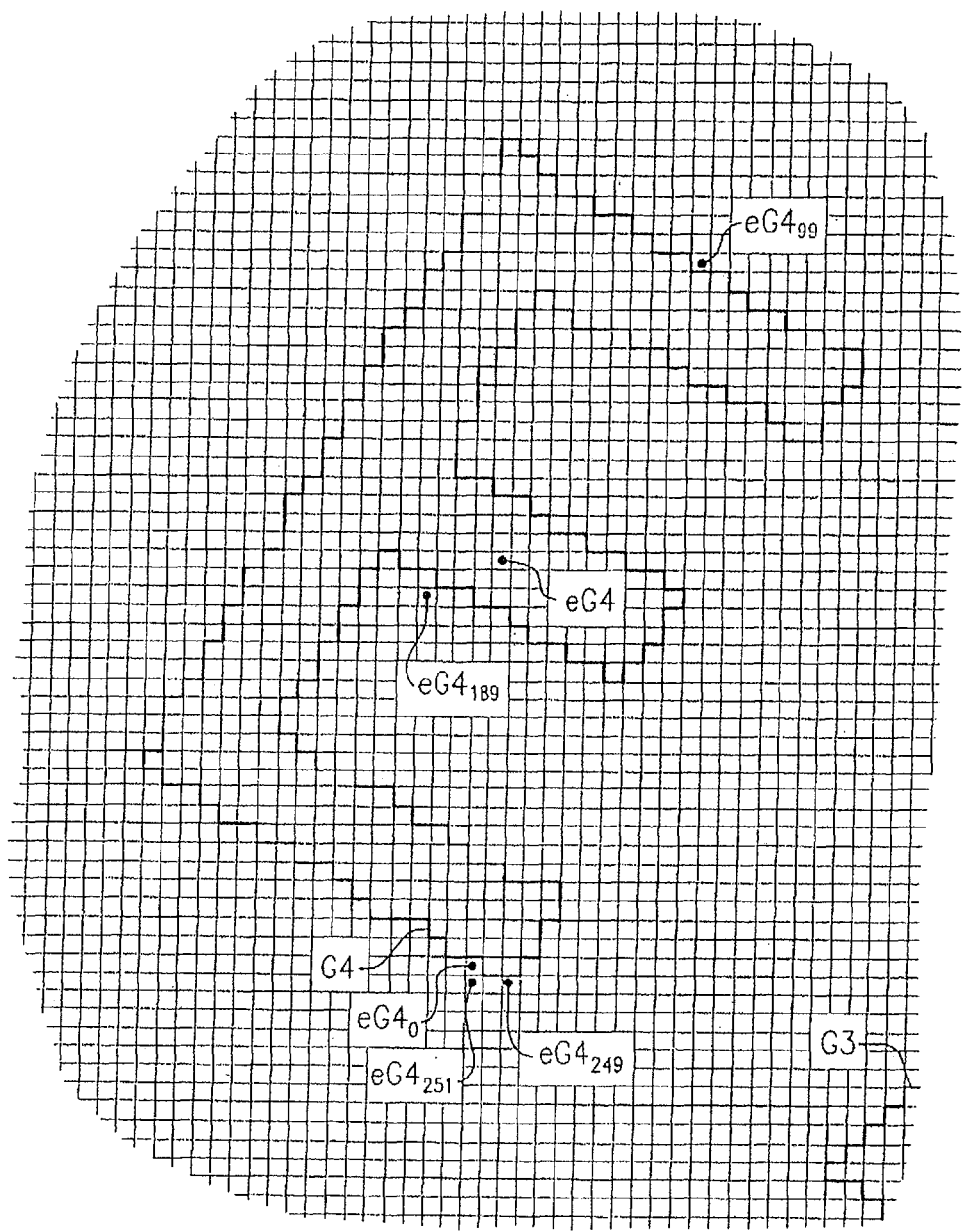

The next pixel grouping found by control circuit 140 by searching for dark pixels in a starburst pattern is pixel grouping G4 corresponding to the recognizable character "E". Applying the above traveling direction initialization and edge crawling rules, control circuit 140 determines that the edge pixels of grouping G4 are edge pixels $eG4_0$, $eG4_1$, $eG4_2$ ... $eG4_{251}$ as is indicated in FIG. 3*d* and further determines at block 16 that the count of edge pixels is $\text{COUNT}_{G4}=252$. Because COUNT≥NE then control circuit 140 proceeds to block 20 to attempt to locate a prior globule having a size similar to that of globule G4.

Applying eq. 1 to estimate the size of globule G4, then $$\text{ESIZE}_{G4} = (eG4_{112} - eG4_{28}) + (eG4_{81} - eG4_{248}) = 39 + 47 = 86$$

Comparing the estimate size of globule G4 to that of globule G3 control circuit 140 confirms at block 20 that the sizes of the two globules G4 and G3 ($\text{ESIZE}_{G3}=77$ and $\text{ESIZE}_{G4}=86$) correlate with one another within the described predetermined tolerance (selected in the exemplary embodiment to be ±12.5%). Having determined that the sizes of two globules correlate, control circuit 140 proceeds to block 24 at which control circuit 140 launches alignment rails at positions determined by characteristics of the similar-sized detected rails.

Figure 3E:
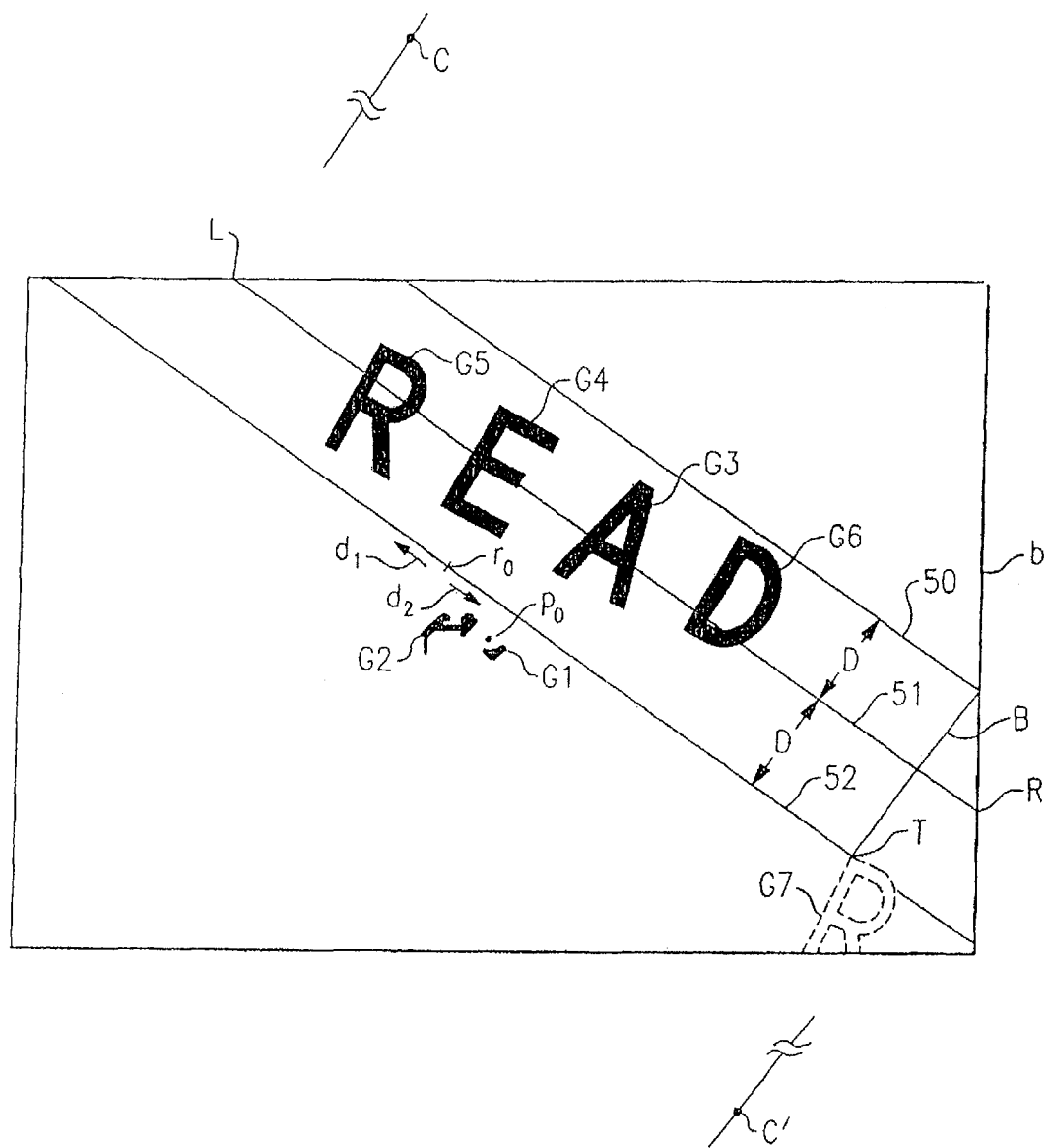

Alignment rails 50 and 52 as described with reference to FIG. 3*e* are linear groupings of pixels which are launched in order to locate and recognize linear strings of recognizable characters. The presence of clear areas above and below a pair of similarly and sufficiently sized pixel groupings extending at least the length of a minimal sequence of OCR characters indicates a likelihood that the pair of pixel groupings belong to a linear string of OCR characters. Recognizable characters are typically printed on an indicia bearing substrate in linear patterns. It will be seen that the alignment rail launch process described herein is useful for locating such linear strings of characters in a captured image, and in estimating the orientation of the linear string of characters in the captured image.

As illustrated with reference to FIG. 3*e*, alignment rails 50 and 52 are launched substantially parallel to center line 51 intersecting the center pixels cG3 and cG4 of two globules G3 and G4 determined to be of similar size, and at spacings from the center line 51 such that rails 50 and 52 extend through pixel positions proximate globules G3 and G4 without intersecting globules G3 and G4. Typically, each alignment rail 50 and 52 extends rightward from the left border of the rail area until the rail encroaches upon a pixel grouping or upon image border b. The encroachment of a rail on a pixel grouping prior to the rail reaching border b can be considered potentially indicative of there being indicia other than recognizable indicia within the rail area. The encroachment of a rail on a pixel grouping prior the rail reaching border b can also be considered potentially indicative of the rail being poorly aligned with the character string comprising the pair of globules whose profiling by control circuit 140 resulted in the rails being launched. In the example described with reference to FIG. 3*e* the misalignment of rail 52 relative to the substantially linear "READ" character string results in rail 52 encroaching upon pixel grouping indicated by dashed-in grouping G7 corresponding to a character of a linear character string oriented parallel to the READ character string. It is seen further that if the "READ" character string contained an additional characterized pixel grouping after the "D" character, the additional pixel grouping would be intersected by rail 50.

A scene imaged by an OCR reader will often contain several rows of printed character strings. It can be seen that if control circuit 140 launches rails 50 and 52 pursuant to locating similarly-sized pixel groupings corresponding to characters from different rows, rails 50 and 52 will likely encroach upon pixel groupings corresponding to characters of the different rows.

In one embodiment control circuit 140 is configured so that if a rail 50 encroaches upon a pixel grouping, control circuit 140 makes no attempt to recognize characters within the present rail area. In this embodiment, control circuit proceeds to block 12 to poll pixels in a starburst pattern if during execution of block 24 (rail launch) a rail encroaches upon a pixel grouping, e.g. grouping G7. In an alternative embodiment, control circuit 140 is configured so that the encroachment of a rail upon a pixel grouping results in a truncation of the rail area, but does not preclude the control circuit's searching for recognizable data within the rail area. That is, control circuit may be configured to establish a rail border B perpendicular to rail 52 at the point T where rail 52 encroaches upon pixel grouping.

In yet another embodiment, control circuit 140 is configured so that if the length of a rail, 50 and 52, is below a minimally sufficient length which is preferably determined relative to the edge lengths of located pixel groupings, then control circuit 140 makes no attempt to recognize characters in the present rail area and instead proceeds to block 12 to poll pixels in a starburst pattern. For example, control circuit 12 can be made to proceed to block 12 after a rail launch if the length of rail 50 or 52 is not greater than the average edge length of similarly sized globules located at block 20. In the case that both rails are above a minimally sufficient length but one of the rails nevertheless encroaches on a pixel grouping such as pixel grouping G7, control circuit 140 preferably truncates the rail area by defining a new border B for the rail area as described previously in connection with FIG. 3*e*.

Rails 50 and 52 may be launched in accordance with a simple mathematical formula. In one embodiment, rails 50 and 52 are a series of pixel positions at a perpendicular oriented spacing distance, S, from center 51. S may be calculated according to the formula:

$$S = (ESIZE_A + ESIZE_B)/5 \qquad \text{eq. 2}$$

where $ESIZE_A$ and $ESIZE_B$, are the estimated sizes of the two globules as estimated by eq. 1 above.

Launching rails at distances from center line 51 according to eq. 2 assures that rails 50 and 52 satisfy the requirements of extending through pixel positions which are proximate recognizable characters, but if well aligned relative to a character string are not likely to encroach upon recognizable characters of a linearly arranged string of recognizable characters. Preferably, control circuit 140 grows rails in first and second directions, $d_1$ and $d_2$, starting from a position $r_0$ along a globule's vertical centerline. The center points, G3 and G4 illustrated in the image representation of FIG. 3c may be determined according to the formula:

$$C[x,y] = [(AVG(x(hi)+x(lo)), AVG((x(hi)+x(lo)))] \qquad \text{eq. 3}$$

After rails 50 and 52 are launched, control circuit 140 attempts to recognize characters defined within the boundaries of rails 51, 52 and border b or border B. More particularly, with rails established, control circuit 140 begins searching for additional dark pixel globules at block 26 by polling pixels along center line 52 beginning at the left edge L of the area defined by rails 50, 52 and border b, or border B.

In the example of FIG. 3e the first dark pixel located when polling pixels along center line 51 is a pixel of globule G5 corresponding the recognizable character "R". When control circuit 140 locates a pixel grouping within a rail area, control circuit at block 30 subjects the grouping to a shape-characterizing edge crawling process. The shape-characterizing edge crawling process is similar to the edge length-determining edge crawling process described herein except that in a shape-characterizing edge crawling process, data is developed that characterizes the shape of a pixel grouping's edge instead of data indicating the length of an edge. Shape-characterizing data is developed, in general, by recording a traveling direction value, D, and a high resolution traveling direction value, $D_H$, for each pixel location of a pixel grouping's edge. The traveling direction value, D, associated with a given edge pixel is a measure of the pixel's direction of travel relative to the position of the pixel's preceding edge pixel. A high density traveling direction values, $D_H$, it will be seen, characterizes the general direction of an edge over a succession of edge pixels. For developing traveling direction values, rules are established for developing an initial traveling direction value, D. These rules are the same as the rules for establishing an initial traveling direction in the edge count determining edge crawling process, except that compass position values, such as N=0, E=1, S=2, W=3, are assigned to the various traveling directions. A possible set of rules for establishing an initial traveling direction value, D, is as follows:

(I) if there is a dark pixel E or SE of the first edge pixel and the pixel S of the first edge pixel is light, then the initial traveling direction is N; D=0

(II) else if there is a dark pixel S or SW of the first edge pixel and the pixel W of the first edge pixel is light, then the initial traveling direction is E; D=1

(III) else if there is a dark pixel W or NW of the first edge pixel and the pixel N of the first edge pixel is light, then the initial traveling direction is S; D=2

(IV) else if there is a dark pixel N or NE of the first edge pixel and the pixel E of the first edge pixel is light, then the initial traveling direction is W; D=3

(V) else edge crawling fails.

Once an initial traveling direction value for shape-characterizing edge crawling is established, the direction of travel about an edge, and the determination of a traveling direction value for each new edge pixel, may be governed by the following shape determining edge crawling rules:

if the pixel looking rightward relative to the current direction is light, turn right, increment D, and advance to that light pixel location;

else if the pixel straight ahead is light, advance to it without changing D;

else if the pixel looking leftward relative to the current traveling direction is light, decrement D and advance to it;

else turn backward, decrement D by 2, and "advance" to the single neighboring light pixel.

Figures 4A, 4D:
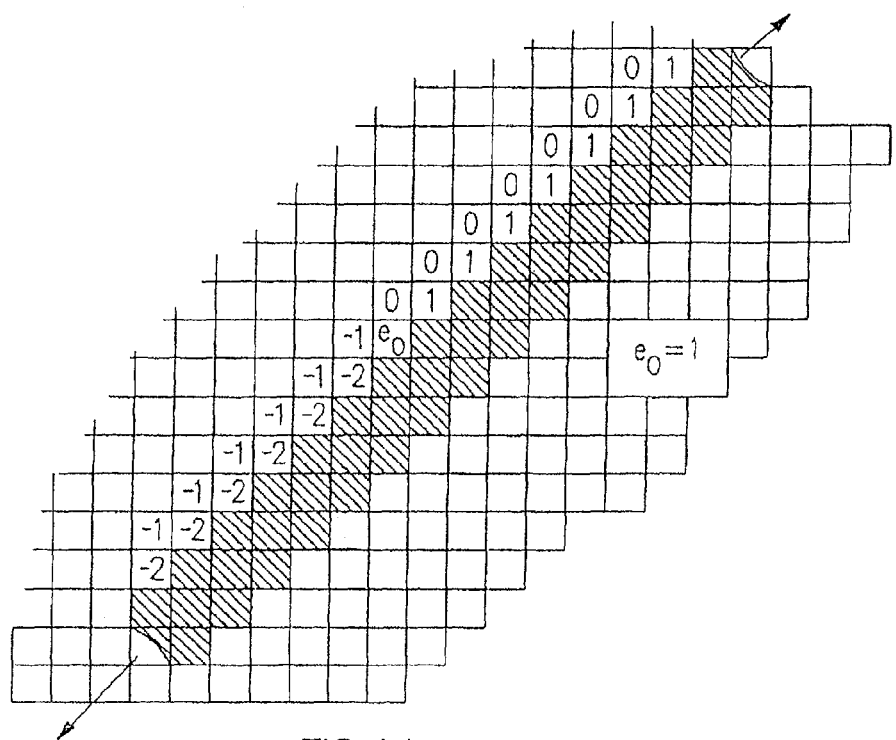
Figures 4B, 4C:
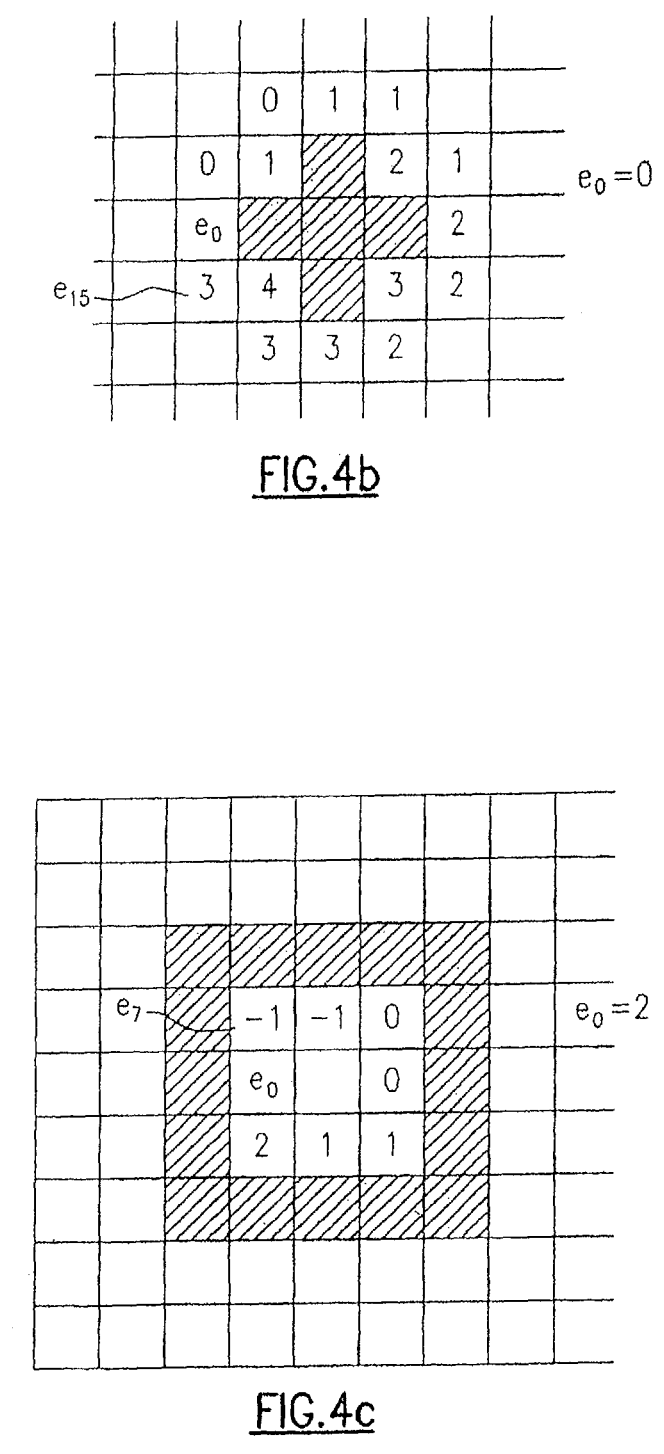

Certain features and advantages of the shape-characterizing edge crawling process as well as methods by which the process can be varied can be easily appreciated with reference to FIGS. 4a-4d illustrating the above edge crawling rules being applied to pixel groupings of various simple configurations, with initial edge pixels in various positions relative to the groupings. In FIGS. 4a to 4d, the first edge pixel of the shape is labeled $e_0$, while the traveling direction values, D, are shown for additional edge pixels of the groupings. In the example of FIG. 4a, condition (IV) of the direction initialization rules applies and edge crawling commences in a westward direction (D=3). In the example of FIG. 4b, condition (I) of the direction initialization rules applies and edge crawling commences in a northward direction (D=0). In the example of FIG. 4c, condition (III) of the direction initialization rules applies and edge crawling commences in a southward direction (D=2). In the example of FIG. 4d, condition (I) of the direction initialization rules applies and edge crawling commences in a northward direction (D=0).

A first observation, as best seen by the plotted traveling direction values of FIG. 4a is that while the traveling direction value, D, may theoretically take on any value, the value "D modulo 4" is always one of 4 values that precisely identifies the traveling direction. By application of the specific edge crawling rules provided, the values D={ ... -8, -4, 0, 4 ... } represent a northward traveling direction; the values D={ ... -7, -3, 1, 5, ... } represent an eastward traveling direction, the values D={ ... -6, -2, -2, 6, ... } represent a southward traveling direction, and the values { ... -5, -1, 3, 7 ... } represent a westward traveling direction.

Any edge crawl that is not terminated by a termination condition (e.g. the border of an image being reached) will eventually result in a traveling direction value being determined for initial edge pixel, $e_0$, a second time. In the example of FIG. 4b a traveling direction value for edge pixel $e_0$ is determined a second time, subsequent to a traveling direction value for edge pixel $E_{15}$ being developed. In the example of FIG. 4b, a traveling direction value for edge pixel $e_0$ is determined a second time subsequent to a traveling direction value for edge pixel $e_7$ being determined. A highly useful result of developing traveling direction values in accordance with the invention is that the difference between $D_1$ ($E_0$), the initial traveling direction valued assigned to a pixel, and $D_2$ ($e_0$), the traveling direction value of the pixel when the pixel is subjected to edge crawling a second time, reveals certain properties of the pixel grouping being subjected to edge crawling. It is seen that when a full loop around pixel groupings has been completed, the direction value, D, will have advanced by exactly 4 if the loop has been made along an outside or clockwise path, and by −4 if the loop has been made along an inside or counterclockwise path. Comparing $D_1$ ($e_0$) to $D_2$ ($e_0$) reveals whether an interior or exterior of a pixel grouping has been traced. Accordingly, control circuit 140 can determine that it has subjected the interior of a character grouping having an interior (such as an "A," a "B," or a "D") to the shape-characterizing process described herein simply by comparing $D_1(e_0)$ to $D_2(e_0)$.

While the traveling direction value, D, discussed thus far characterizes the direction of travel between two pixels along a prescribed path and therefore the relative positioning between two pixel positions, the shape of an edge of a pixel grouping comprising a plurality of pixels can be characterized by high resolution traveling direction values, $D_H$. Control circuit 140 calculates a high resolution traveling direction value $D_H$, by summing N successive traveling direction values, D.

If N is selected to be 4, for example, then control circuit 140 may commence calculation of a running sum of pixel values when a travel direction value, D, is calculated for the 4th edge pixel, $E_3$, as is indicated by the Table 1. The running sum of the directional values may be referred to as a high resolution traveling directional value, $D_H$, since the value represents the general direction of an edge over a succession of edge pixels. When a traveling direction value, D is calculated for each new edge pixel starting with the N=4 edge pixel, the high resolution traveling directional value, $D_H$, is updated. Because $D_H$ at any edge pixel, $E_x$, can be calculated according to the formula $D_H(E_x)=D_H(E_x-1)+D(E_x)-D(E_x-N)$ then maintaining a running sum of traveling direction values requires minimal processing time.

More particular benefits of maintaining a running sum of traveling direction values are discussed in greater detail with reference to FIG. 4d showing a simple pixel grouping comprising an edge defining a straight diagonal row. Applying the edge crawling rules as outlined above at starting position $e_0$, traveling direction values are 1, 0, 1, 0 . . . as is indicated in FIG. 4d. If the running sum, $D_H$, is calculated beginning after the 10th traveling direction value is determined, and for each edge pixel thereafter, then the running sum, $D_H$, at the 10th edge pixel, and at each edge pixel thereafter equals 1+0+1+0+1+0+1+0+1=5. Similarly, for a straight horizontal edge, the running sum, $D_H$, will always equal 1+1+1+1+1+1+1+1+1+1=10 and for a line directed southeast, $D_H$ will at all times equal 2+1+2+1+2+1+2+1+2+1=15. The sum of successive N values, taken modulo 4xN, establishes 4xN compass points defining the direction of edge travel (mathematicians may note that these points are not precisely evenly spaced around a circle, but that the error is small, characterizable, and cyclical by quadrant). It can be seen that calculating running sum of traveling direction values allows the shape of certain types of pixel groupings to be discriminated. For example, the running sum, $D_H$, calculating using N=10 during an edge crawl about a square will be characterized by 4 "stretches" wherein, the value $D_H$ remains at an approximately constant value, which is about 10 points higher than the preceding such stretch.

Increasing the number, N, of traveling direction values summed in a running sum of traveling directional values operates to improve the hiding of irregularities or "bumps" along edges that are generally straight, but results in the recorded $D_H$ values characterizing corners of a pixel grouping as rounded edges.

Figure 3F:
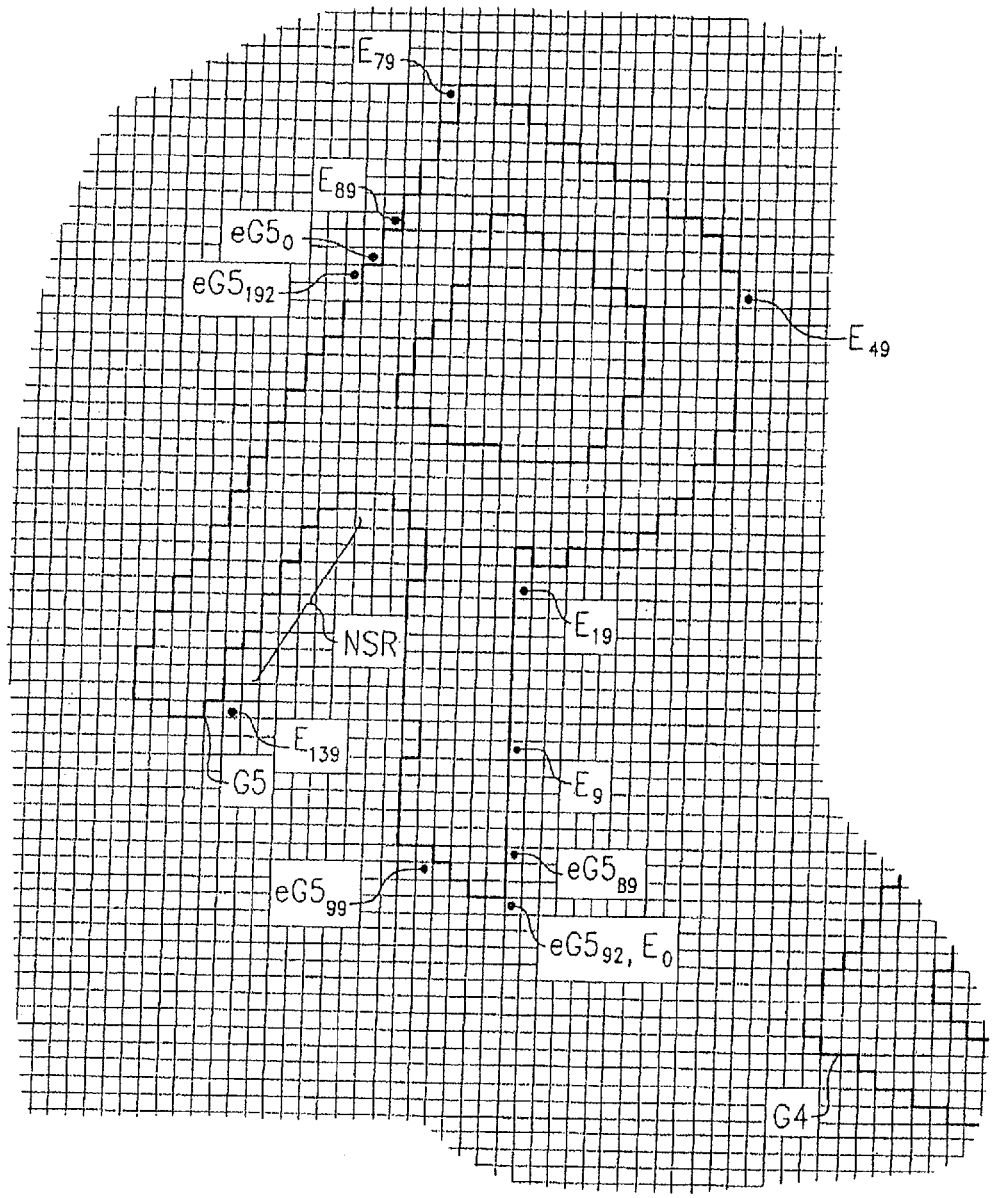

An example illustrating one method by which control circuit 140 at block 30 can apply the above edge crawling rules to develop data characterizing the shape of pixel grouping located along rail area centerline 51 such that the developed data can be compared in a useful manner to stored reference data is described with reference to FIG. 3f, showing pixel group G5 in high resolution, FIG. 5b showing partial contents of a matrix of reference shape-characterizing data 62 corresponding to several reference characters R, S, T, U, V, W, X, Y, and Z, and FIG. 5c showing an exemplary reference character. Useful comparison of the developed data to the stored data 62 can be provided by developing shape-characterizing data representing the shape of grouping G5 starting from a certain edge position of pixel grouping G5. In the example described with reference to FIG. 3f, this position is selected to be the grouping's most southeastern edge pixel so that the developed data corresponds to the stored data 62 comprising succeeding segments of data, $DHA_{SG0}$, $DHA_{SG1}$, . . . $DHA_{SGM-1}$, each segment of data representing a shape characteristic of a succeeding segment, seg0, seg1 . . . segM-1 of a reference character starting at a reference character's, e.g. character 64, southeastern corner. The position of a pixel grouping's most southeast edge pixel can be determined by finding the edge pixel which is the farthest distance from mathematically interpolated point C, a certain point along a line perpendicularly intersecting centerline 51 at point L. Preferably point C is selected to be several rail heights above centerline 51. From what has been discussed thus far it can be seen that this edge pixel can readily be located by subjecting pixel grouping G5 to a limited edge crawling process for recording edge pixel positions, in which pixel positions $eG5_0$, $eG5_1$, $eG5_2$ . . . $eG5_{193}$ are recorded as the edge pixel positions for group G5. For example, pixel grouping G5 can be subjected to the edge length determining edge crawling process described herein starting at edge pixel $eG5_0$ (except that it is not necessary that control circuit 140 maintain a count of edge pixels in recording the edge pixels). Further, it will be seen that if the pixel grouping located by searching along center line 51 is a globule previously subjected to edge length-determining edge crawling that these edge positions have previously been recorded into memory 145. When the edge pixel positions are recorded, and the most southeastern edge pixel identified, control circuit 140 develops shape-characterizing data for the pixel grouping beginning with the step of determining an initial traveling direction value, D, for the most southeastern edge pixel, E0, $eG5_{92}$.

To develop traveling direction values which generally descend for succeeding edge pixels about an exterior of a pixel grouping control circuit 140 may apply "left" shape-characterizing edge crawling rules, derivable from the above right edge. Left edge crawling rules for establishing an initial traveling direction, and traveling direction value, $D_0$, for southeastern edge pixel $E_0$ are:

1. If there is a dark pixel W or SW of edge pixel E0, and the pixel S of edge pixel, $E_0$, is light, then the initial traveling direction is N; D=0

2. Else if there is a dark pixel S or SE of the first edge pixel and the pixel E of the first edge pixel is light, then the initial traveling direction is W; D=3

3. Else if there is a dark pixel E or NE of the first edge pixel and the pixel N of the first edge pixel is light, then the initial traveling direction is S; D=2

4. Else if there is a dark pixel N or NW of the first edge pixel and the pixel W of the first edge pixel is light, then the initial traveling direction value is E; D=1

5. Else edge crawling fails.

In the example described with reference to FIG. 3f, it can be seen that Rule 4 above applies that the initial traveling direction is E, which is assigned a value of D=1 according to the above rules. Traveling direction values for the remaining edge pixels $E_0$–$E_{193}$ ($eG5_{92}$–$eG5_0$–$eG5_{93}$) of group G5 can be determined by decrementing D by 1 if the present edge pixel (e.g. edge pixel $EG_1$) is leftward relative to the previous edge pixel's traveling direction, incrementing D by 1 if the present edge pixel (e.g. edge pixel $E_{31}$) is rightward relative to the previous pixel's traveling direction, decrementing D by 2 if the present edge pixel, (e.g. pixel $E_{21}$) is backward relative to previous pixel's traveling direction, and by maintaining D constant if the present edge pixel (e.g. pixel $E_2$ is straight ahead relative to the previous edge pixel's traveling direction).

A partial set of traveling direction values for pixel grouping G5 developed according to the above left shape-characterizing edge crawling rules are summarized in Table 1 herein:

TABLE 1

| Edge Pixel | D | $D_H$ |
|---|---|---|
| $E_0$ | 1 | 5 |
| $E_1$ | 0 | 3 |
| $E_2$ | 0 | 2 |
| $E_3$ | 0 | 1 |
| $E_4$ | 0 | 0 |
| $E_5$ | 0 | 0 |
| $E_6$ | 0 | 0 |
| $E_7$ | 0 | 0 |
| $E_8$ | 0 | 0 |
| $E_9$ | 0 | 0 |
| . | . | . |
| . | . | . |
| . | . | . |
| $E_{89}$ | −2 | −7 |
| $E_{90}$ | −1 | −6 |
| $E_{91}$ | −2 | −7 |
| $E_{92}$ | −2 | −7 |
| $E_{93}$ | −1 | −6 |
| $E_{94}$ | −2 | −7 |
| $E_{95}$ | −2 | −7 |
| $E_{96}$ | −1 | −6 |
| $E_{97}$ | −2 | −7 |
| $E_{98}$ | −2 | −7 |
| . | . | . |
| . | . | . |
| . | . | . |
| $E_{139}$ | −3 | −13 |
| $E_{140}$ | −4 | −14 |
| $E_{141}$ | −4 | −14 |
| $E_{142}$ | −4 | −15 |
| $E_{143}$ | −3 | −15 |
| $E_{144}$ | −4 | −15 |
| $E_{145}$ | −3 | −14 |
| $E_{146}$ | −4 | −14 |
| $E_{147}$ | −4 | −15 |
| $E_{148}$ | −3 | −14 |

After developing shape-characterizing data comprising traveling directions and high resolution traveling direction values as indicated in Table 1, control circuit 140 continuing with the execution of block 30, (unless it determines that an interior of a character has been crawled as explained with reference to FIGS. 4b and 4c, in which case control circuit 140 typically proceeds to block 26) processes the shape-characterizing data so that it can be compared to stored reference data and at block 32 compares the present globule's shape-characterizing edge data 60 to data 62 of a database comprising previously stored shape-characterizing edge data for series of characters. Based on the comparison, control circuit 140 selects as the recognized character the character corresponding to the closest fit previously stored data.

Because the count of edge pixels that comprise an edge of an imaged character are highly unpredictable and depend upon a variety of factors including the reader-to-target distance, font size, and the resolution of the reader, it is normally necessary to scale the present pixel groupings shape-characterizing data so that the data can be productively compared to stored shape-characterizing data. In the embodiment explained with reference to FIGS. 5a-5c, data scaling is accomplished by segmentation of both reference characters, e.g. OCR B "R" reference character 64, and imaged characters, e.g., pixel grouping G5, into an identical number of substantially equal lengthened segments during generation of the developed data 60 and the stored reference data 62. In the generation of stored data 62, the outer perimeters of reference characters, e.g. character 64, are divided into M equal lengthened segments, $seg_0$, $seg_1$, ... $seg_{M-1}$, and for each of the M segments, an average high resolution traveling direction, $DHA_{SG0}$, $DHA_{SG1}$, ... $DHA_{SGM-1}$ is recorded into database 62. Each average high resolution traveling direction value $DHA_{SGi}$, is calculated by averaging a string of high resolution traveling direction values, DH, corresponding to a segment, e.g., $seg_1$, of a reference character, e.g. reference character 64.

Similarly, in the generation of developed data 62, the edge pixels of pixel groupings, e.g. grouping G5 are divided into M equal lengthened segments, and for each of the M segments, control circuit 140 calculates an average high resolution traveling direction value, $DHA_{sg0}$, $DHA_{sg1}$, ... $DHA_{sgM-i}$. Each average high resolution traveling direction value, $DHA_{sgi}$, is calculated by averaging a string of high resolution traveling direction values, DH, corresponding to a segment of the pixel grouping. When segmenting a pixel grouping, e.g. grouping G5 into a plurality of substantially equal lengthened segments, it is preferred that control circuit 140 accounts for the fact that a linear pair grouping of edge pixels, e.g. edge pixels $E_9$, $E_{10}$, represent a greater distance along the perimeter of a character than a diagonal grouping of edge pixels, e.g. edge pixels $E_{50}$ and $E_{51}$. In the particular example described with reference to FIG. 3f, and with the stored data 62 as shown in FIG. 5B, M=32, and the total number of edge pixels is $COUNT_{G5}$=194. The number, n, of edge pixels comprising each segment may therefore be between about n=5 and n=7, depending on positional relationship between the edge pixels.

In addition to adjusting for scale discrepancies represented between the shape-characterizing data expressed in Table 1 and the stored reference data 62, control circuit 140 preferably adjusts for orientation discrepancies between the shape-characterizing data and the stored data 62. While by convention stored reference data 62 corresponds to a reference character in a northward aligned orientation, the developed shape characterizing data of Table 1 corresponds to a character pixel grouping obliquely oriented in an image.

A highly significant advantage of the present invention is that the orientation representation of shape-characterizing data developed by the processes described herein can readily be adjusted. As seen with reference to the example of FIG. 4d, the orientation representation of a shape characterized by a succession of high resolution traveling direction values, $D_H$, can be adjusted by offsetting of the $D_H$ values. To adjust the orientation representation of shape-characterizing data in the development of applied shape-characterizing data 60, control circuit 140 may offset each average high resolution traveling direction values, $DHA_{sgi}$, of the developed shape-characterizing data as expressed in Table 1 by a value, OFFSET, determined by the slope of rail 52. The offset value, OFFSET, may be determined according to the formula:

$$OFFSET = ((CMPSTS) \times (rail\ angle))/360\ deg. \qquad Eq.\ 4$$

where CMPSTS is the number of compass positions expressed by the developed high resolution traveling direction, $D_H$, values, and "rail angle" is the angle of the rail in degrees relative to the image's horizontal axis. In the example of the data expressed in Table 1 developed from the image shown in FIG. 3h, CMPSTS=4×N=16 and the rail angle of rail 52 is approximately −38 degrees. Accordingly, the orientation representation of each high resolution traveling direction value can be adjusted by an offset value of OFFSET=−1.69.

Actual stored reference data such as reference data 62 is preferably scaled and offset to values in the 0 to 255 range so as to be readily expressed in binary 8 bit numbers of substantial resolution. The particular stored reference data 62 are generated by scaling high resolution traveling values, $D_H$, by a factor of 8 to generate 8×CMPST=128 compass positions, offsetting $DHA_{sgi}$ values by multiples of the number of compass positions, and adding 40 to avoid final $DHA_{sgi}$ values in the negative range.

Scaling and offsetting the shape-characterizing data of Table 1 on accordance with reference data 62, and adding the orientation OFFSET value to the result, confirms the accuracy of the shape characterization. As seen in Table 1, the string of edge pixels in the northward stretch region NSR of pixel grouping G5 have traveling directions such as {−4, −4, −3, −4, −3, −4} and high resolution traveling direction values such as {−15, −15, −14, −14, −15}. Scaling and offsetting data corresponding to this segment of edge pixels yields DHA value for the segment of DHA=((−88×8)/6)+128+40=INT[50.66]=51 prior to orientation offsetting. Adding the scaled orientation offset of OFFSET=INT[−13.51]=−14 to the DHA value yields a DHA value for the segment of DHA=51−14=37, which corresponds well to DHA=40, modulo 128, values in the stored reference data 60 corresponding to northward stretch reference character segments, e.g. $DHA_{SG25}$, $DHA_{SG4}$ (reference character "T") of the reference data 62.

In spite of the provision for orientation adjustment of the developed data, the reorientation of data, under certain circumstances, may not be sufficient to result in selection of a best fit set of data from the stored shape-characterizing database. Note, that in the example of FIG. 3*f*, alignment rails 50 and 51 are substantially not orientated to the orientation of the character string. Accordingly, control circuit 140 can be made so that, if character recognition fails, control circuit 14 reorients center line 51, and alignment rails 50 and 51, based on the positions of a different set pixel groupings within rails 50 and 52. FIG. 3*g* shows a reoriented center line 51' intersecting calculated center points of groupings G4 and G5, and reoriented alignment rails 50' and 52' oriented to the reoriented centerline. It is seen that centerline 51' more accurately represents the orientation of the character string, which may improve recognition of the best fit data. Applying a new offset value calculated using the slope of rail 52' (rail angle ≈−30 degrees) to the DHA values corresponding to the northward stretch region NSR edge pixels of Group G5 yields a DHA value for a typical segment defined in the stretch of DHA=51+INT[−10.67]=51−11=40, which matches DHA=40, modulo 128, northward direction values of the stored data 62.

When a pixel grouping's shape-characterizing data is scaled and offset for scale and orientation adjustment and for compatibility with stored reference data, 62, control circuit 140 at block 32 selects the character represented by the pixel grouping by identifying the stored data that best fits the developed data. A variety of known mathematical methods may be utilized for the identification of the best fit data. In one embodiment, control circuit 140 may calculate the absolute value of the difference between each average high resolution traveling direction value, $D_HA$, of the developed data 60 and the corresponding stored data ($DHA_{SGi}$−$DHA_{sgi}$), sum these differences and select the best fit data as the data yielding the lowest sum. That is, an error sum assigned to a particular reference character may be calculated according to the formula:

$$ERSUM=|DHA_{SG0}-DHA_{sg0}|+|DHA_{SG1}-DHA_{sg1}|\ldots |DHA_{SGM-1}-DHA_{sgM-1}| \qquad \text{Eq. 5}$$

Should an initial comparison between developed data and stored data fail to yield a candidate best fit set of data within a predetermined tolerance, it may be beneficial to calculate a difference sum between the developed and stored data by taking into consideration differences between DHA values for segments of the developed data, e.g. $DHA_{sgi}$ and those of either immediately preceding ($DHA_{SGi-i}$) or immediately succeeding ($DHA_{SGi+i}$) segments of the stored data. For example, the error sum assign a particular reference character may be calculated according to the formula:

$$ERSUM=|DHA_{SG1}-DHA_{sg0}|+|DHA_{SG2}-DHA_{sg1}|\ldots +|DHA_{SGM-1}-DHA_{sgM-2}| \qquad \text{Eq. 6}$$

As is indicated by the loop defined by blocks 24, 26, 28, 30, and 32, control circuit 140, if recognition is successful at block 32, continues to poll pixels along center line 51 of the rail area to locate and recognize character pixel groupings until the end of the rail area is reached (block 34). The operation of control circuit 140 in the case recognition fails at block 32 depends on the particular configuration of control circuit 140.

Control circuit 140 can be adapted so that if control circuit 140 at block 32 fails to select a best fit set of character data from reference data 32 control circuit 140 nevertheless proceeds to block 26 to continue to search for dark pixels along center line 51. Control circuit 140 also may be configured, as explained previously with reference to FIG. 3*g*, to locate and size a different pair of pixel grouping within the rail area to launch a different set of rails, e.g., rails 50' and 52', in the case recognition fails at block 32. Still further, control circuit 140 can be configured to proceed to block 12 to poll pixels in a starburst pattern in the case recognition fails at block 34 (which may result in a new set of rails being launched at block 24).

Further still, control circuit 32 can be configured to attempt to recognize an upside down imaged character string in the case recognition fails at block 32. The orientation adjustment processing described herein above is useful for correcting for orientation discrepancies between developed (e.g. Table 1) and stored reference data 62 for a recognizable character oriented at any orientation in a captured image within a 180 degree radius (+−90 degrees from horizontal). To facilitate 360 degree recognition of recognizable imaged characters, stored reference data 62 is made to include shape-characterizing data corresponding to upside down oriented reference characters and control circuit 140 is configured so that control circuit modifies its polling of pixels along center line 51 in the case recognition fails at block 32. Specifically, control circuit 140 can be configured to commence polling of pixels in a leftward direction starting from the right edge R of the rail area in the case recognition fails at block 32 in search of pixel groupings representative of upside-down imaged characters. If control circuit 140 locates a pixel grouping during leftward center line pixel polling, control circuit 140 may develop shape-characterizing data beginning at the most northwest edge pixel of the pixel grouping as determined based on the greatest distance to mathematically interpolated point C', and may proceed to attempt recognize the upside down imaged character as explained previously in connection with block 32 by comparison of the developed data to the stored upside down reference character data of reference data 62.

Control circuit 140 can also be configured to attempt to recognize right side up and upside down imaged characters concurrently. For example, at the time control circuit 140 develops shape-characterizing data as shown in Table 1 starting from the most southeast edge pixel $E_0$, control circuit 140 can also develop shape-characterizing data starting from the most northwest edge pixel location. Control circuit 140 at block 32 can then compare the two sets of developed data, the rightside up developed shape-characterizing data, and the upside down shape-characterizing data to stored reference data 62 that includes reference shape-characterizing data for both rightside up and upside down reference characters. When configured to recognize rightside up and upside down imaged characters concurrently, control circuit 140 may select both a best fit set rightside up reference characters and a best fit set of upside down reference characters and may select between the sets of characters based on which string yields the lowest cumulative error sum.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention as defined in the following claims.

The invention claimed is:

1. A method for utilization of device having an imaging assembly including an image sensor, a memory, and a hand graspable housing, the method including:
    activating capture of image data into said memory;
    searching for pixel groupings utilizing said image data, wherein a pixel grouping is characterized by one or more adjacent like valued pixels;
    identifying a pair of similarly sized pixel groupings;
    utilizing a result of said identifying, determining a location for searching for a character pixel grouping;
    developing shape characterizing data for said character pixel grouping; and
    recognizing a character represented by said character pixel grouping.

2. The method of claim 1, wherein the method includes binarizing said image data.

3. The method of claim 1, wherein the method includes determining edge pixels of said pixel groupings.

4. The method of claim 1, wherein the method includes determining edge pixels of said character pixel grouping.

5. An optical character recognition optical reader for recognizing recognizable characters in a captured image, said reader comprising:
    an imaging assembly including an image sensor for generating image signals;
    a hand graspable housing;
    a memory having stored character reference data stored therein;
    control circuit in communication with said memory and said image sensor, said control circuit being operative for capturing image data into said memory, said control circuit further being operative for:
    searching for pixel groupings utilizing said image data;
    determining edge pixels of said pixel groupings;
    based on said determining, identifying a pair of similarly sized pixel groupings;
    utilizing a result of said identifying, determining a location for searching for a character pixel grouping;
    developing shape characterizing data for said character pixel grouping utilizing edge pixels of said character pixel grouping; and
    recognizing a character represented by said character pixel grouping.

6. The reader of claim 5, wherein said control circuit is operative for binarizing said image data.

7. The reader of claim 5, wherein said memory stores shape characterizing data.

\* \* \* \* \*